US011898394B2

(12) United States Patent
Fujita et al.

(10) Patent No.: US 11,898,394 B2
(45) Date of Patent: Feb. 13, 2024

(54) MOTOR MODULE

(71) Applicants: Atsushi Fujita, Aichi (JP); Katsunori Kigoshi, Aichi (JP)

(72) Inventors: Atsushi Fujita, Aichi (JP); Katsunori Kigoshi, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 330 days.

(21) Appl. No.: 17/475,278

(22) Filed: Sep. 14, 2021

(65) Prior Publication Data

US 2022/0081952 A1 Mar. 17, 2022

(30) Foreign Application Priority Data

Sep. 15, 2020 (JP) ................................ 2020-154618

(51) Int. Cl.

| | |
|---|---|
| ***H02M 7/537*** | (2006.01) |
| ***E05F 15/695*** | (2015.01) |
| ***E05F 15/41*** | (2015.01) |
| *E05F 15/697* | (2015.01) |

(52) U.S. Cl.

CPC ............ *E05F 15/695* (2015.01); *E05F 15/41* (2015.01); *E05F 15/697* (2015.01); *E05Y 2900/55* (2013.01)

(58) Field of Classification Search

CPC .............................. E05F 15/41; H02P 29/028

See application file for complete search history.

(56) References Cited

U.S. PATENT DOCUMENTS

| | | | | |
|---|---|---|---|---|
| 7,830,107 | B2 | 11/2010 | Noue et al. | |
| 8,120,293 | B2 | 2/2012 | Nomura et al. | |
| 10,662,695 | B2 | 5/2020 | Yanagita et al. | |
| 2010/0083579 | A1* | 4/2010 | Kigoshi ............. | G05B 19/4061 49/358 |
| 2012/0025643 | A1 | 2/2012 | Shibusawa et al. | |

FOREIGN PATENT DOCUMENTS

| | | | |
|---|---|---|---|
| JP | 20013639 | A | 1/2001 |
| JP | 20022293 | A | 1/2002 |
| JP | 2006256547 | A | 9/2006 |
| JP | 2008231878 | A | 10/2008 |

(Continued)

*Primary Examiner* — Muhammad S Islam

(74) *Attorney, Agent, or Firm* — HAUPTMAN HAM, LLP

(57) ABSTRACT

A motor module includes: a motor; a driving unit; a control unit; a memory; and a communication unit. The control unit executes: receiving parameter information specialized for a vehicle-mounted device by the communication unit from a management module, and storing the parameter information in the memory; in a case where the parameter information is stored in the memory, driving the motor by the driving unit to operate the vehicle-mounted device so that the motor outputs a predetermined torque based on an operation signal input from an outside for operating the vehicle-mounted device and the parameter information; and in a case where the parameter information is not stored in the memory, driving the motor by the driving unit for a certain period of time and then stopping the motor to inch the vehicle-mounted device so that the motor outputs a maximum torque, based on the operation signal.

4 Claims, 14 Drawing Sheets

(56) References Cited

FOREIGN PATENT DOCUMENTS

| | | | |
|---|---|---|---|
| JP | 201520647 | A | 2/2015 |
| JP | 2017210798 | A | 11/2017 |
| TW | M400957 | U1 | 4/2011 |
| WO | 2007004617 | A1 | 1/2007 |
| WO | 2010110112 | A1 | 9/2010 |

* cited by examiner

<FIRST SEAT>

<SECOND SEAT>

<THIRD SEAT>

FIG. 9

| | | INPUT PORT P1 | | | |
|---|---|---|---|---|---|
| | | EQUAL TO OR MORE THAN V3 | EQUAL TO OR MORE THAN V2 AND LESS THAN V3 | EQUAL TO OR MORE THAN V1 AND LESS THAN V2 | LESS THAN V1 |
| INPUT PORT P2 | EQUAL TO OR MORE THAN V3 | ABNORMAL | ABNORMAL | ABNORMAL | ABNORMAL |
| | EQUAL TO OR MORE THAN V2 AND LESS THAN V3 | ABNORMAL | IDENTIFICATION INFORMATION Ai FOR DRIVER'S SEAT | IDENTIFICATION INFORMATION Ci FOR SECOND SEAT | ABNORMAL |
| | EQUAL TO OR MORE THAN V1 AND LESS THAN V2 | ABNORMAL | IDENTIFICATION INFORMATION Bi FOR FIRST SEAT | IDENTIFICATION INFORMATION Di FOR THIRD SEAT | ABNORMAL |
| | LESS THAN V1 | ABNORMAL | ABNORMAL | ABNORMAL | ABNORMAL |

FIG. 10 <AFTER NORMAL COMPLETION OF LEARNING PROCESS>
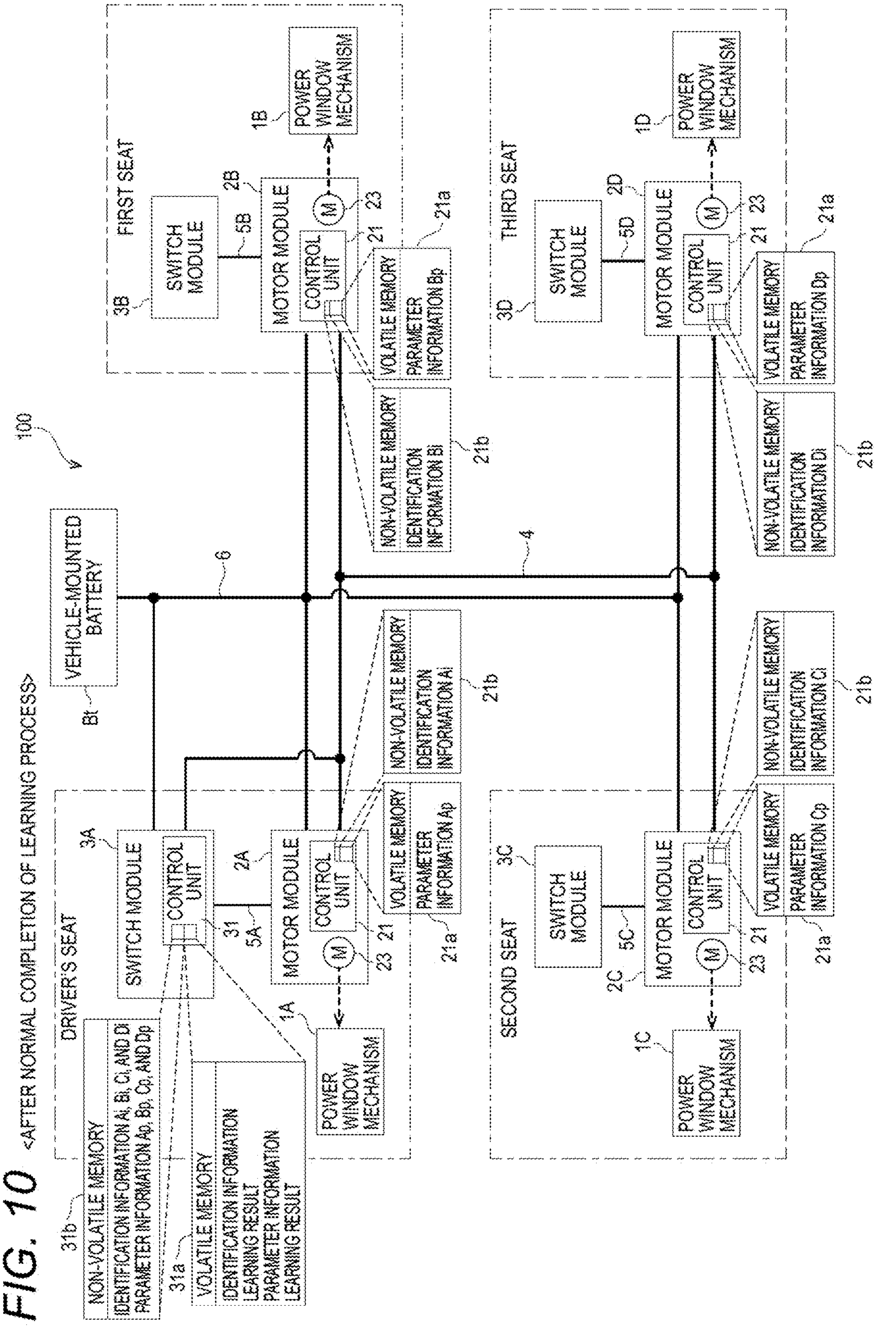

MOTOR MODULE

CROSS-REFERENCE TO RELATED APPLICATIONS

This application is based upon and claims the benefit of priority from Japanese Patent Application No. 2020-154618 filed on Sep. 15, 2020, the entire contents of which are incorporated herein by reference.

FIELD

One or more embodiments of the present invention relate to a motor module that operates a vehicle-mounted device such as a power window mechanism mounted on a vehicle.

BACKGROUND

In order to operate a vehicle-mounted device mounted on a vehicle such as an automobile, a motor module as disclosed in, for example, WO-A1-2010/110112 is used. This motor module is integrated with a motor, which is a power source for the vehicle-mounted device, a mechanism of decelerating a rotation of a rotary shaft of the motor, a sensor of detecting a rotation speed of the motor, a driving unit of driving the motor, a control unit of operating the driving unit to control the drive of the motor, and the like.

In addition to the above configuration, there is also a motor module integrated with a memory that stores information for operating the vehicle-mounted device, and a communication unit that communicates with another module or apparatus via a network such as LAN or CAN built in the vehicle. For example, JP-A-2015-020647 and JP-A-2006-256547 disclose a vehicle-mounted device control system including such a motor module (a slave device) and a management module (a master device) that manages the motor module. The management module is configured with an electronic control unit (ECU) including a control unit having a CPU or the like, a memory, a communication unit that performs communication via a network of a vehicle, and the like, or a module having other functions.

In order for the motor module to control an operation of the vehicle-mounted device and for the management module to control the motor module, it is necessary to perform initial settings. Therefore, in JP-A-2015-020647, identification information of the slave device and a driver (software) for the master device to control the slave device are stored in a memory of the slave device in advance. At a time of initial setting, the slave device transmits the identification information and the driver stored in the memory of the slave device to the master device via the network. When the master device receives the identification information and the driver from the slave device, the master device associates the identification information and the driver, and stores the identification information and the driver in the memory. At a time of subsequent operation, the master device transmits a control command according to a condition indicated by the driver to the slave device together with identification information. The slave device receives the control command, controls an operation of a main body unit such as a motor based on the control command, and operates the vehicle-mounted device.

Further, for example, JP-A-2006-256547 discloses a technology in which a slave device determines identification information of the slave device, based on a voltage applied from a master device or another slave device connected via a network. Specifically, a resistance circuit provided in a plurality of slave devices is connected in series to an electric wire connected to a voltage supply unit provided in the master device, and a voltage is applied to the electric wire from the voltage supply unit. Then, the slave device determines the identification information of the slave device, based on a voltage division value of the resistance circuit of the slave device, and stores the identification information in a memory.

Further, for example, WO-A1-2007/004617 discloses a technology in which a control unit separate from a motor learns information for controlling a drive of the motor so as to cause a power window mechanism of a vehicle to safely perform an opening and closing operation. Specifically, based on a pulse signal generated by a pulse generator according to a drive state of the motor, the control unit detects the drive state such as a rotation speed of the motor and an opening and closing state of a window glass such as an opening and closing position of a window. When no foreign matter is caught in the window, the control unit learns a pulse width of the pulse signal generated by the pulse generator according to the drive state of the motor and a change rate of the pulse width, and stores the pulse width and the change rate in a memory as parameter information (threshold value or the like) for pinching determination.

On the other hand, TW-U1-M400957, JP-A-2001-003639, JP-A-2017-210798, JP-A-2002-002793, and JP-A-2008-231878 disclose a technology of inching a motor or a power window mechanism in a case where a failure, a malfunction, or the like occurs, in consideration of safety and convenience. Specifically, in TW-U1-M400957, in a case where a failure related to a motor occurs, a window glass is moved by a certain amount of displacement. According to JP-A-2001-003639, in a case where a disconnection occurs in a window frame sensor, a closing operation of a window glass is inched. According to JP-A-2017-210798, when a rise switch is turned on after a window glass is moved by an external force or a weight of the window glass, unintentionally by a user, a motor is operated for a certain period of time, and then stopped to immediately stop the rise of the window glass. According to Japanese JP-A-2002-002293, in a case where a control unit is reset due to a voltage drop and a learning process for an absolute position of a window glass becomes infeasible, even when a command for an automatic opening and closing operation is received, after a motor is operated by a small amount in this command direction, the motor is stopped. In JP-A-2008-231878, in a case where an origin position of a window glass is not set, a drive of a motor is controlled to intermittently operate the window glass by a predetermined count value.

SUMMARY

In order to operate the vehicle-mounted device safely by the motor module, it is necessary to store parameter information for motor control specialized for the vehicle-mounted device in a memory of the motor module in advance. Meanwhile, in a case where the parameter information is not stored in the memory of the motor module for some reason such as a failure, the motor module may not be able to operate the vehicle-mounted device safely. Further, in this case, when safety is prioritized and the operation of the motor or the vehicle-mounted device is prohibited, convenience of a user is impaired.

An object of one or more embodiments of the invention is to safely operate a vehicle-mounted device, and ensure convenience even in an emergency such as a failure.

According to an aspect of the present invention, there is provided a motor module including: a motor that is a power source of a vehicle-mounted device mounted on a vehicle; a driving unit that drives the motor; a control unit that operates the driving unit and controls the drive of the motor to operate the vehicle-mounted device; a memory that stores information for the control unit to operate the vehicle-mounted device; and a communication unit that performs communication via a network built in the vehicle. The control unit executes a "parameter learning process" of receiving parameter information for motor control specialized for the vehicle-mounted device for operating the vehicle-mounted device by the communication unit from a management module that manages the motor module, and storing the parameter information in the memory. In addition, the control unit executes a "normal process" of, in a case where the parameter information is stored in the memory, driving the motor by the driving unit to operate the vehicle-mounted device so that the motor outputs a predetermined torque, based on an operation signal input from an outside for operating the vehicle-mounted device and the parameter information. Further, the control unit executes an "inching process" of, in a case where the parameter information is not stored in the memory, driving the motor by the driving unit for a certain period of time and then stopping the motor to inch the vehicle-mounted device so that the motor outputs a maximum torque, based on the operation signal input from the outside.

With the above configuration, by the parameter learning process, the motor module receives the parameter information for motor control specialized for the vehicle-mounted device from the management module via the network and stores the parameter information in the memory inside. After that, in a case where the parameter information is stored in the memory of the motor module, based on the operation signal input from the outside and the parameter information, the motor module executes the normal process, and drives the motor to operate the vehicle-mounted device so that the motor outputs a predetermined torque. Therefore, in normal time when the motor module has (stores) the parameter information, it is possible for the motor module to safely and reliably operate the vehicle-mounted device, according to the operation signal.

In a case where the parameter information is not stored in the memory of the motor module due to some reason such as a failure, based on the operation signal input from the outside, the motor module executes the inching process, and drives the motor for a certain period of time to inch the vehicle-mounted device so that the motor outputs the maximum torque. Therefore, even in an emergency when the motor module does not have (store) the parameter information, it is possible for the motor module to safely and reliably operate the vehicle-mounted device, according to the operation signal, and to ensure convenience of a user.

According to one or more embodiments of the present invention, it is possible for a motor module to safely operate a vehicle-mounted device, and to ensure convenience, even in an emergency such as a failure.

BRIEF DESCRIPTION OF DRAWINGS

FIG. 9 is a diagram illustrating the method of determining the identification information of the motor module in FIG. 1;

FIG. 10 is a diagram illustrating a state after normal completion of a learning process of the power window system in FIG. 1;

DETAILED DESCRIPTION

Figure 1:
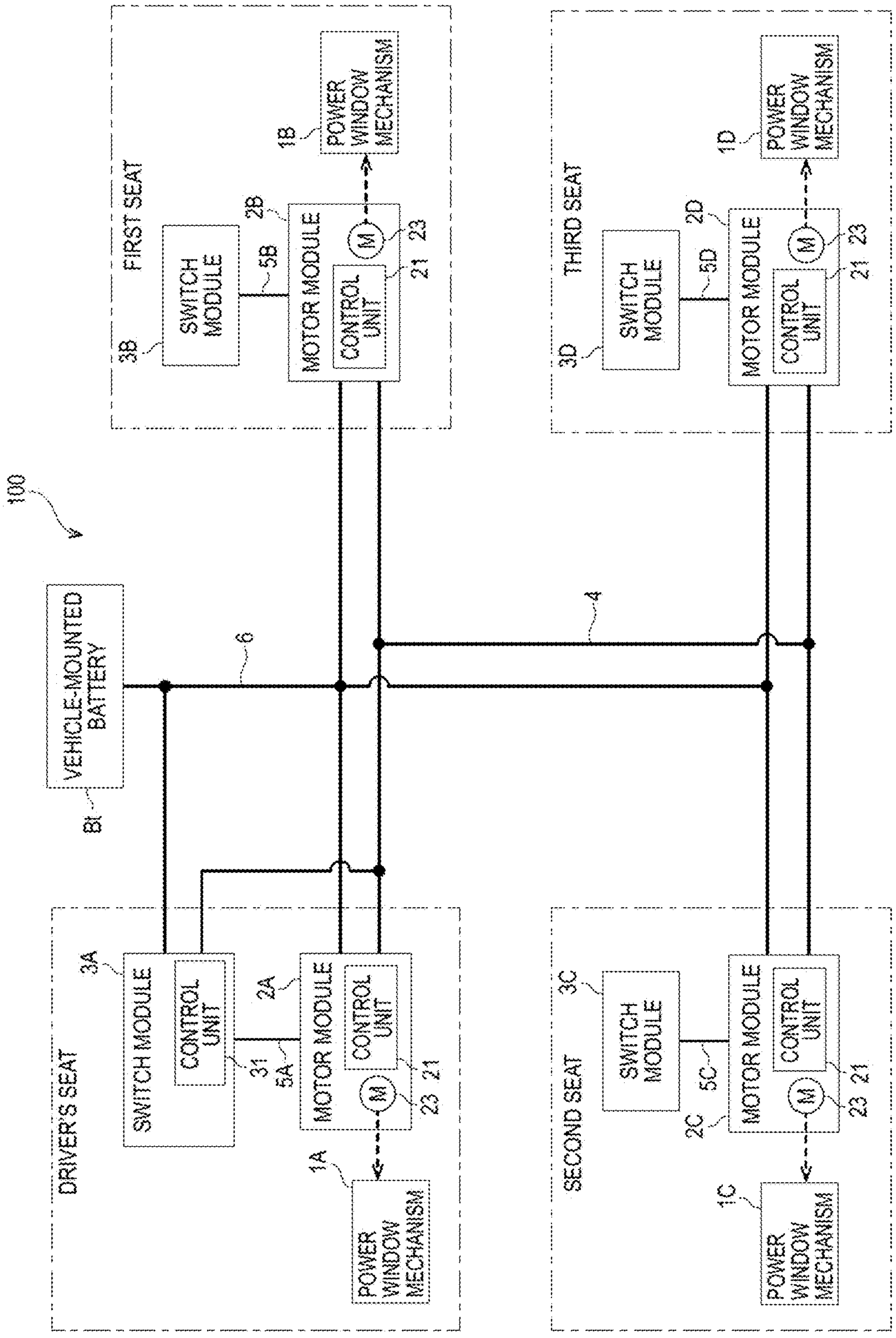
FIG. 1 is a schematic view of a power window system of an embodiment.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the present invention will be described with reference to the drawings. In each drawing, the same portions or corresponding portions will be denoted the same reference numeral.

First, a configuration of a power window system of the embodiment will be described.

FIG. 1 is a schematic view of a power window system 100. The power window system 100 is mounted on a vehicle including an automatic four-wheeled vehicle. The power window system 100 includes a plurality of power window mechanisms 1A, 1B, 1C, and 1D, a plurality of motor modules 2A, 2B, 2C, and 2D, a plurality of switch modules 3A, 3B, 3C, and 3D, and a network 4.

The power window mechanism 1A, the motor module 2A, and the switch module 3A are installed in a driver's seat of the vehicle. The power window mechanism 1B, the motor module 2B, and the switch module 3B are installed in a first seat (for example, an assistant seat) of the vehicle. The power window mechanism 1C, the motor module 2C, and the switch module 3C are installed in a second seat (for example, a left rear seat) of the vehicle. The power window mechanism 1D, the motor module 2D, and the switch module 3D are installed in a third seat (for example, a right rear seat) of the vehicle.

The network 4 is configured with a wired local area network (LAN) built in the vehicle. The respective motor modules 2A, 2B, 2C, and 2D, and the switch module 3A in the driver's seat are connected to the network 4. As another example, instead of the LAN, a controller area network (CAN), a local interconnect network (LIN), or a wired or wireless network other than the CAN and the LIN may be provided in the vehicle.

The power window mechanisms 1A, 1B, 1C, and 1D are configured with a window glass of each window of the driver's seat, the first seat, the second seat, and the third seat of the vehicle, a mechanism that moves the window glass to open and close the window, and the like. The power window mechanisms 1A, 1B, 1C, and 1D have physical individual differences such as a shape or a friction coefficient between members. The power window mechanisms 1A, 1B, 1C, and 1D are examples of a "vehicle-mounted device" according to the embodiment of the present invention.

The motor modules 2A, 2B, 2C, and 2D have a motor 23, that is a power source of respectively operating the corresponding power window mechanisms 1A, 1B, 1C, and 1D, a control unit 21, and the like (details will be described below). The respective motor modules 2A, 2B, 2C, and 2D have identical specifications and performance. In FIG. 1, for convenience, components provided in each of the motor modules 2A, 2B, 2C, and 2D are denoted by the same reference numerals (the same applies to FIGS. 2 to 5, 7, and 10, which will be described below).

The switch modules 3A, 3B, 3C, and 3D have a plurality of switches which operate in a case of causing the corresponding power window mechanisms 1A, 1B, 1C, and 1D to open and close the window (details will be described below). The switch modules 3A, 3B, 3C, and 3D are examples of the "operation module" according to the embodiment of the present invention.

The switch module 3A in the driver's seat also includes a plurality of switches (details will be described below) of remotely operating the power window mechanisms 1B, 1C, and 1D in the other seats located away from the driver's seat, a control unit 31, or the like. The switch module 3A in the driver's seat communicates with the motor modules 2A, 2B, 2C, and 2D of each seat via the network 4, and manages the motor modules 2A, 2B, 2C, and 2D. The switch module 3A in the driver's seat is an example of a "management module" according to the embodiment of the present invention.

The motor module and the switch module (2A and 3A, 2B and 3B, 2C and 3C, and 2D and 3D) installed in the same seat are respectively connected one-to-one by harness 5A, 5B, 5C, and 5D without going through the network 4. Power is supplied from a vehicle-mounted battery Bt mounted on the vehicle to each of the motor modules 2A, 2B, 2C, and 2D, and the switch module 3A in the driver's seat through a power supply line 6.

Next, configurations of the respective motor modules 2A, 2B, 2C, and 2D and the switch modules 3A, 3B, 3C, and 3D will be described in detail.

Figure 2:
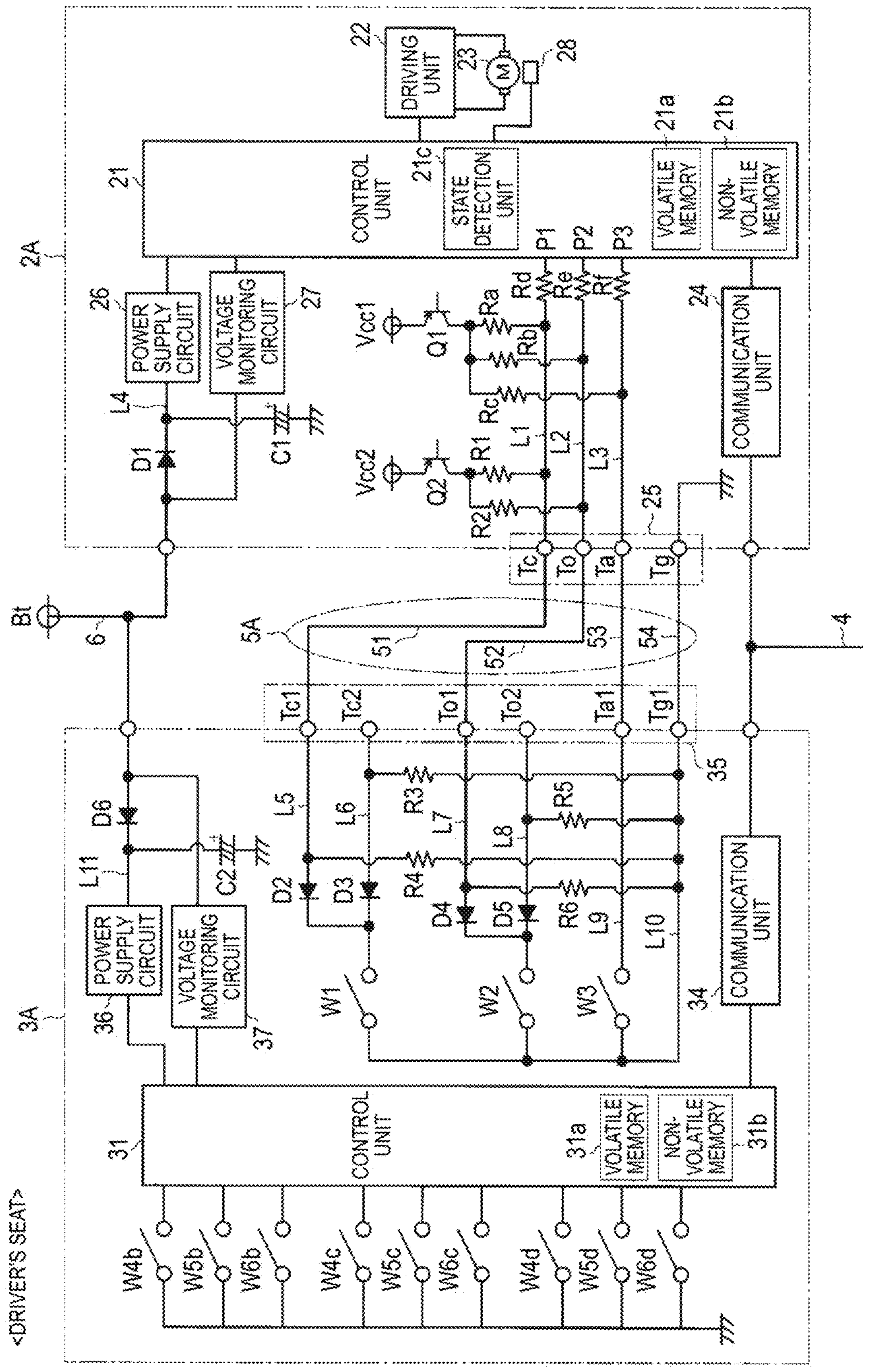
FIG. 2 is a detailed schematic view of a switch module and a motor module in a driver's seat in FIG. 1.
Figure 3:
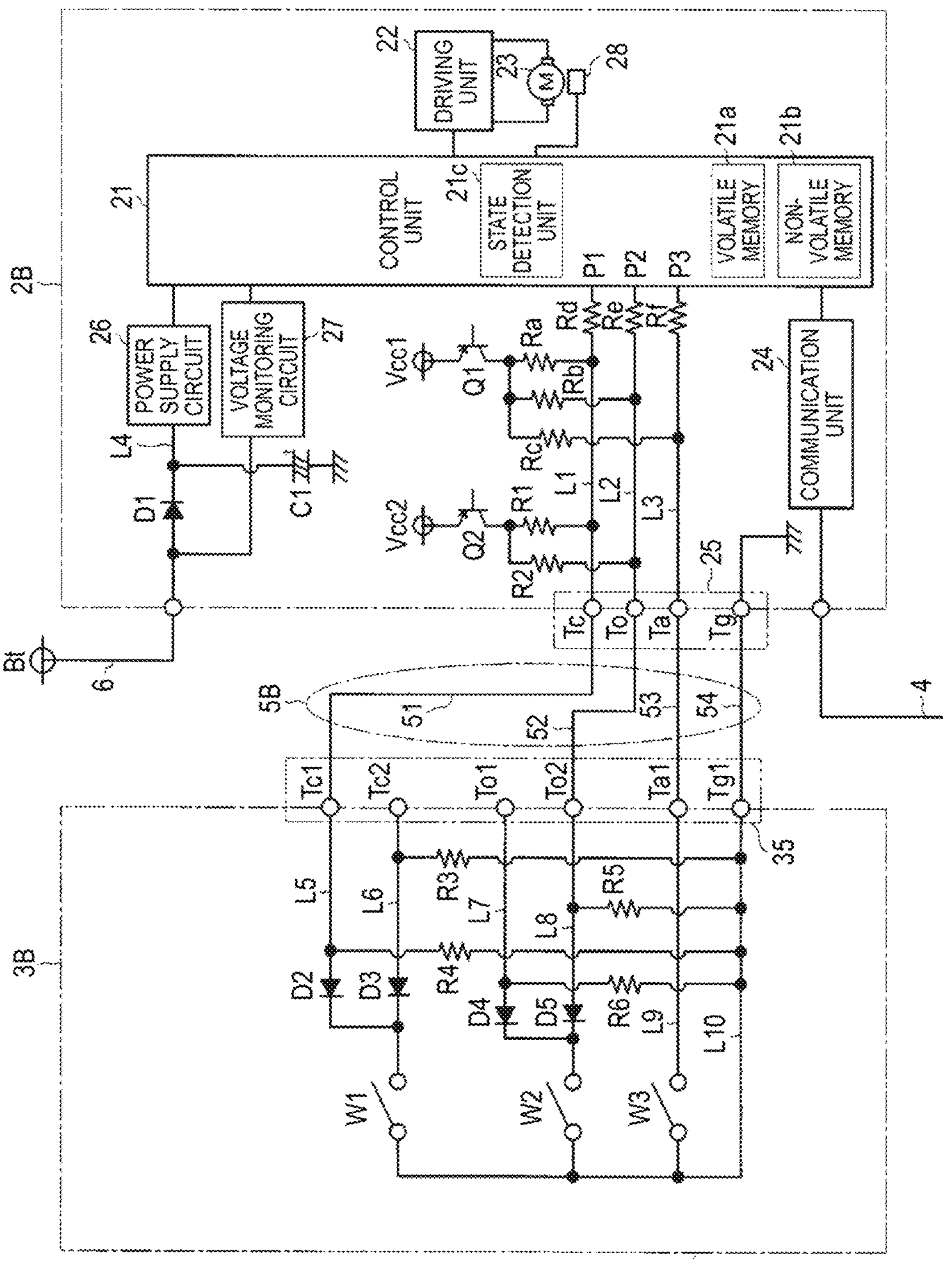
FIG. 3 is a detailed schematic view of a switch module and a motor module of a first seat in FIG. 1.
Figure 4:
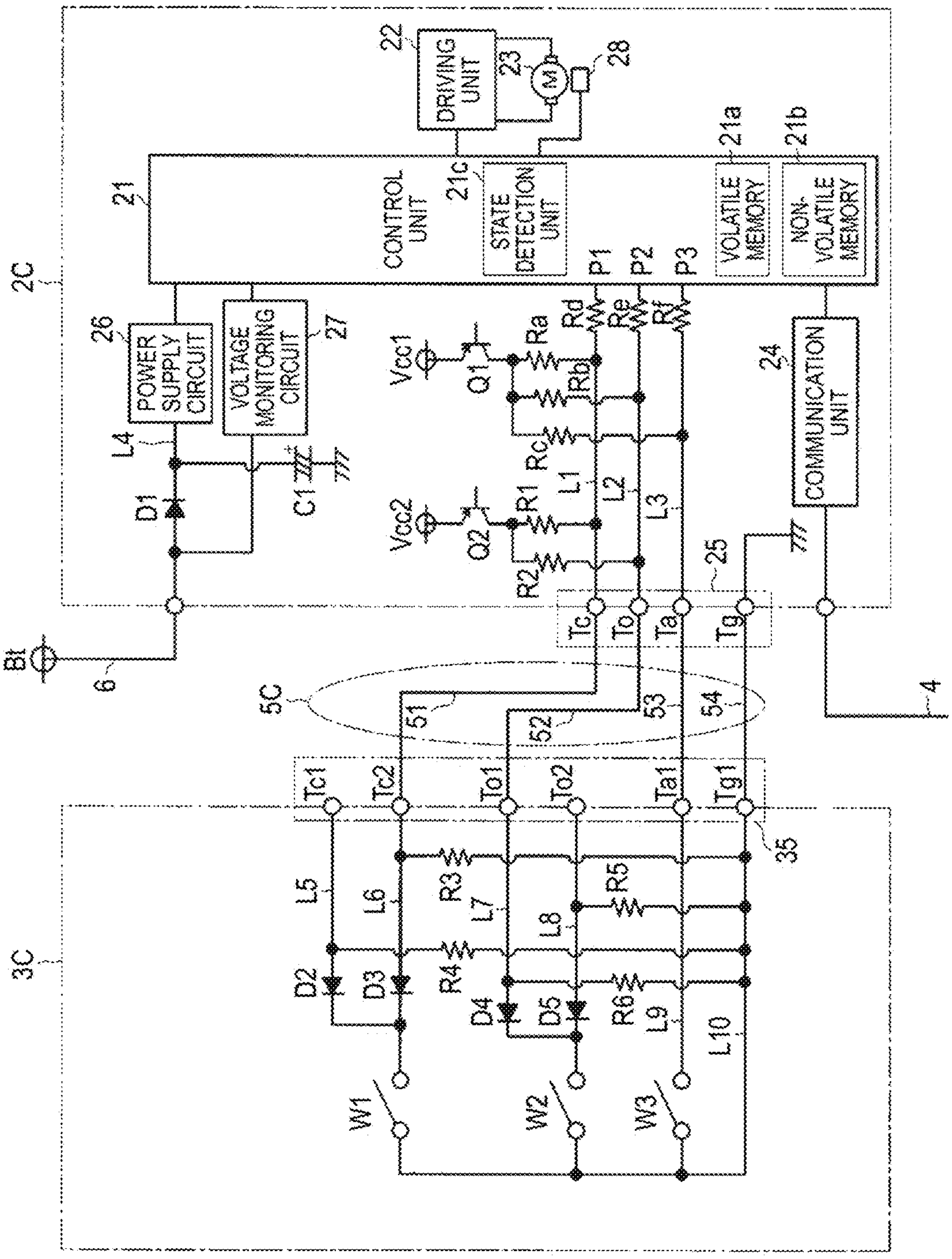
FIG. 4 is a detailed schematic view of a switch module and a motor module of a second seat in FIG. 1.
Figure 5:
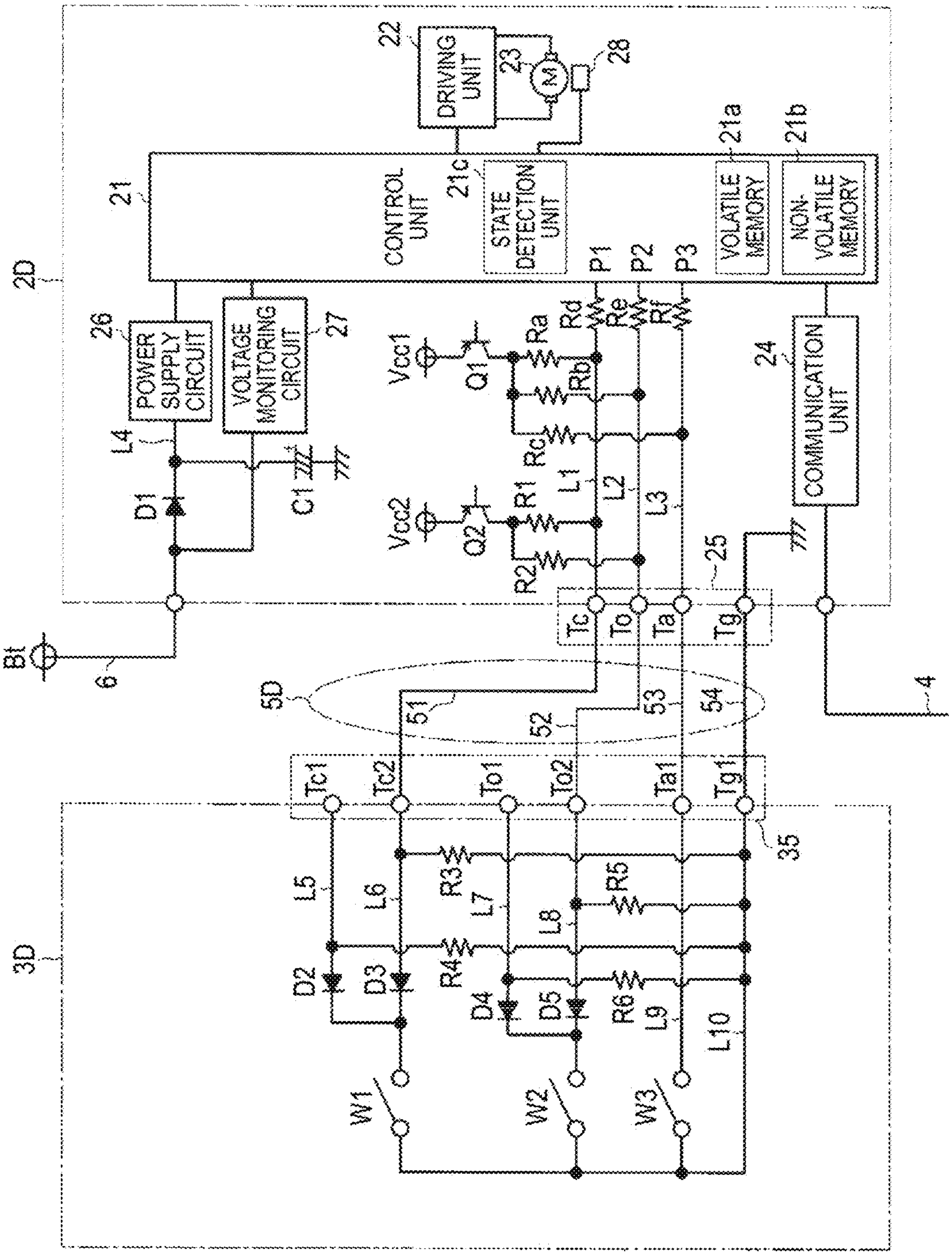
FIG. 5 is a detailed schematic view of a switch module and a motor module of a third seat in FIG. 1.

FIG. 2 is a schematic view of the motor module 2A and the switch module 3A in the driver's seat. FIG. 3 is a schematic view of the motor module 2B and the switch module 3B in the first seat. FIG. 4 is a schematic view of the motor module 2C and the switch module 3C in the second seat. FIG. 5 is a schematic view of the motor module 2D and the switch module 3D in the third seat. In FIGS. 2 to 5, for convenience, the corresponding portions are denoted by the same reference numerals.

As illustrated in FIGS. 2 to 5, the motor modules 2A, 2B, 2C, and 2D in the respective seats include the control unit 21, a driving unit 22, the motor 23, a rotary encoder 28, a communication unit 24, a connection unit 25, a power supply circuit 26, a voltage monitoring circuit 27, and the like.

The control unit 21 is configured with a CPU or the like, and includes a volatile memory 21*a*, a non-volatile memory 21*b*, and a state detection unit 21*c* inside. The driving unit 22 includes a circuit that drives the motor 23. The control unit 21 operates the driving unit 22 to control the drive of the motor 23 and operate the corresponding power window mechanisms 1A, 1B, 1C, and 1D (FIG. 1). Information for operating the corresponding motor 23 and the power window mechanisms 1A, 1B 1C, and 1D is stored in the volatile memory 21*a* and the non-volatile memory 21*b* of the control unit 21 (details will be described below). The memories 21*a* and 21*b* of the motor modules 2A, 2B, 2C, and 2D are examples of a "memory" and a "second memory" according to the embodiment of the present invention.

The rotary encoder 28 outputs a pulse synchronized with rotation of the motor 23. The state detection unit 21*c* of the control unit 21 detects the pulse output from the rotary encoder 28, detects a drive state such as a rotation speed or a rotation direction of the motor 23, and also detects an opening and closing state such as an opening and closing position of a window glass or an opening and closing degree of a window of the power window mechanisms 1A, 1B, 1C, and 1D, based on the pulse. The control unit 21 controls the drive of the motor 23 by the driving unit 22, based on the detection result of the state detection unit 21*c*.

The communication unit 24 includes a circuit of performing communication via the network 4. The connection unit 25 includes a connector of respectively connecting the corresponding switch modules 3A, 3B, 3C, and 3D by the harnesses 5A, 5B, 5C, and 5D. The connection unit 25 is provided with a plurality of terminals Tc, To, Ta, and Tg. One ends of the respective electric wires 51, 52, 53, and 54 provided in the harnesses 5A, 5B, 5C, and 5D are connected to the respective terminals Tc, To, Ta, and Tg.

The terminals Tc, To, Ta, and input ports P1, P2, and P3 of the control unit 1 are respectively connected by internal wirings L1, L2, and L3. Resistors Rd, Re, and Rf are respectively provided on the internal wirings L1, L2, and L3. Further, one end of the resistor Ra and one end of the resistor R1 are respectively connected between the resistor Rd on the internal wiring L1 and the terminal Te. One end of the resistor Rb and one end of the resistor R2 are respectively connected between the resistor Re on the internal wiring L2 and the terminal To. One end of the resistor Re is connected between the resistor Rf on the internal wiring L3 and the terminal Ta. The other ends of the resistors Ra, Rb, and Re are connected to a power supply Vcc1 via a switching element Q1. The other ends of the resistors R1 and R2 are connected to a power supply Vcc2 via a switching element Q2. The terminal Tg is grounded to the ground.

A rectifier diode D1 and the power supply circuit 26 are provided on an internal wiring L4 for power supply from the vehicle-mounted battery Bt to the control unit 21. The internal wiring L4 is connected to the external power supply line 6. The power supply circuit 26 is located on a cathode side of the rectifier diode D1, and converts a high voltage supplied from the vehicle-mounted battery Bt into a predetermined low voltage to supply the voltage to the control unit 21. A power supply backup capacitor C1 is provided between the rectifier diode D1 and the power supply circuit 26. The voltage monitoring circuit 27 monitors a level of the supply voltage from the vehicle-mounted battery Bt.

The switch modules 3A, 3B, 3C, and 3D in the respective scats are provided with a connection unit 35, switches W1, W2, and W3, and the like. The connection unit 35 includes a connector for connecting the corresponding motor modules 2A, 2B, 2C, and 2D by the harnesses 5A, 5B, 5C, and 5D. The connection unit 35 is provided with a plurality of terminals Tc1, Tc2, To1, To2, Ta1, and Tg1. Among the terminals Tc1, Tc2, To1, To2, Ta1, and Tg1, the other end of the electric wire 53 of the harnesses 5A, 5B, 5C, and 5D and the other end of the electric wire 54 are respectively connected to the terminal Ta1 and the terminal Tg1.

In order for the motor modules 2A, 2B, 2C, and 2D to identify the switch modules 3A, 3B, 3C, and 3D connected to each, a connection state between each motor module and each switch module is different depending on the seat. Specifically, as illustrated in FIGS. 2 and 3, the other ends of the electric wires 51 of the harnesses 5A and 5B are respectively connected to the terminals Tc1 of the switch module 3A in the driver's seat and the switch module 5B in the first seat. As illustrated in FIGS. 4 and 5, the other ends of the electric wires 51 of the harnesses 5C and 5D are respectively connected to the terminals Tc2 of the switch module 3C of the second seat and the switch module 3D of the third seat.

Further, as illustrated in FIGS. 2 and 4, the other ends of the electric wires 52 of the harnesses 5A and 5C are respectively connected to the terminals To1 of the switch module 3A in the driver's seat and the switch module 3C in the second seat. As illustrated in FIGS. 3 and 5, the other ends of the electric wires 52 of the harnesses 5B and 5D are respectively connected to the terminals To2 of the switch module 3B of the first seat and the switch module 3D of the third seat. In this manner, four types of harnesses can be used so as to make the connection state of the motor module and the switch module different.

The switches W1, W2, W3 of each of the switch modules 3A, 3B, 3C, and 3D are turned on (short-circuited) or turned off (open-circuited) by a user to operate the corresponding power window mechanisms 1A, 1B, 1C, and 1D. Specifically, for example, when the corresponding power window mechanisms 1A, 1B, 1C, and 1D are manually closed, the switch W1 is turned on. Further, when the corresponding power window mechanisms 1A, 1B, 1C, and 1D are manually opened, the switch W2 is turned on. Further, when the corresponding power window mechanisms 1A, 1B, 1C, and 1D are automatically closed, the switch W1 and the switch W3 are turned on. Further, when the corresponding power window mechanisms 1A, 1B, 1C, and 1D are automatically opened, the switch W2 and the switch W3 are turned on. Further, when the manual opening and closing operation of the corresponding power window mechanisms 1A, 1B, 1C, and 1D is stopped, the switch W2 or the switch W1 is turned off. Further, when the automatic opening and closing operation of the corresponding power window mechanisms 1A, 1B, 1C, and 1D is stopped, the switch W2 or the switch is turned on or off again.

The switch modules 3A, 3B, 3C, and 3D installed near to, and connected to the respective motor modules 2A, 2B, 2C, and 2D, by the harnesses 5A, 5B, 5C, and 5D without going through the network 4 are examples of a "second switch module" according to the embodiment of the present invention.

In the switch modules 3A, 3B, 3C, and 3D, a rectifier diode D2 is provided on the internal wiring L5 of which one end is connected to the terminal Tc1. A rectifier diode D3 is provided on the internal wiring L6 of which one end is connected to the terminal Tc2. Each cathode of the rectifier diodes D2 and D3 is connected to one end of the switch W1.

A rectifier diode D4 is provided on the internal wiring L7 of which one end is connected to the terminal To1. A rectifier diode D5 is provided on the internal wiring L8 of which one end is connected to the terminal To2. Each cathode of the rectifier diodes D4 and D5 is connected to one end of the switch W2.

The other end of the internal wiring L9 of which one end is connected to the terminal Ta1 is connected to one end of the switch W3. The other end of each of the switches W1, W2, and W3 is connected to the internal wiring L10. The terminal Tg1 is also connected to the internal wiring L10.

One end of the resistor R4 is connected to the internal wiring L5 between the terminal Tc1 and the rectifier diode D2. One end of the resistor R3 is connected to the internal wiring L6 between the terminal Tc2 and the rectifier diode D3. One end of the resistor R6 is connected to the internal wiring L7 between the terminal To1 and the rectifier diode D4. One end of the resistor R5 is connected to the internal wiring L8 between the terminal Tot and the rectifier diode D5. The other ends of the resistors R3, R4, R5, and R6 are connected to the internal wiring L10. Resistance values of the resistors R3 and R4 are different from each other. Further, resistance values of the resistors R5 and 6 are also different from each other.

In an identification information learning process (step S2 in FIG. 6), which will be described below, the switches W1, W2, and W3 of the switch modules 3A, 3B, 3C, and 3D are not turned on. At this time, in the motor module 2A in the driver's seat in FIG. 2 and the motor module 2B in the first seat in FIG. 3, the control unit 21 turns on the switching element Q2, so that a current from the power supply Vcc2 flows to the electric wire 51 of the harnesses 5A and 5B connected to the terminal Tc, through the resistor R1, the terminal Tc, and the like. The current passing through the electric wire 51 flows to the ground, through the terminal Tc1, the resistor R4, the terminal Tg1 of the switch module 3A in the driver's seat and the switch module 3B in the first seat, the electric wire 54 of the harnesses 5A and 5B connected to the terminal Tg1*l*, the terminal Tg of the motor modules 2A and 2B, and the like.

Further, in the motor module 2C of the second seat in FIG. 4 and the motor module 2D of the third seat in FIG. 5, when the control unit 21 turns on the switching element Q2, a current from the power supply Vcc2 flows to the electric wire 51 of the harnesses 5C and 5D connected to the terminal Tc, through the resistor R1, the terminal Tc, and the like. The current passing through the electric wire 51 flows to the ground, through the terminal Tc2, the resistor R3, the terminal Tg1 of the switch module 3C of the second seat and the switch module 3D of the third seat, the electric wire 54 of the harnesses 5C and 5D connected to the terminal Tg1, the terminal Tg of the motor modules 2C and 2D, and the like.

Further, in the motor module 2A in the driver's seat in FIG. 2 and the motor module 2C in the second seat in FIG. 4, when the control unit 21 turns on the switching element Q2, a current from the power supply Vcc2 flows to the electric wire 52 of the harnesses 5A and 5C connected to the terminal To, through the resistor R2, the terminal To, and the like. The current passing through the electric wire 52 flows to the ground, through the terminal To2, the resistor R6, the terminal Tg1 of the switch module 5A in the driver's seat and the switch module 3D in the second seat, the electric wire 54 of the harnesses 5A and 5C connected to the terminal Tg1, the terminal Tg of the motor modules 2A and 2C, and the like.

Further, in the motor module 2B of the first seat in FIG. 3 and the motor module 2D of the third seat in FIG. 5, when the control unit 21 turns on the switching element Q2, a current from the power supply Vcc2 flows to the electric wire 52 of the harnesses 5B and 5D connected to the terminal To, through the resistor R2, the terminal To, and the like. The current passing through the electric wire 52 flows to the ground, through the terminal To2, the resistor R5, the terminal Tg1 of the switch module 3B of the first seat and the switch module 3D of the third seat, the electric wire 54 of the harnesses 5B and 5D connected to the terminal Tg1, the terminal Tg of the motor modules 2B and 2D, and the like.

As described above, a voltage is applied to the input ports P1 and P2 provided in the control unit 21 by the current flowing from the power supply Vcc2 of the motor modules 2A, 2B, 2C, and 2D to the ground, via the switch modules 3A, 3B, 3C, and 3D. The control unit 21 determines identification information of the motor modules 2A, 2B, 2C, and 2D to which the control unit 21 belongs, based on the voltage value applied to the input ports P1 and P2 (details will be described below).

In a normal mode (step S5 in FIG. 6, and FIG. 11) or an emergency mode (step S7 in FIG. 6, and FIG. 13), which will be described below, in the motor modules 2A, 2B, 2C, and 2D, the control unit 21 turns on the switching element Q1, so that the current from the power supply Vcc1 flows to the electric wires 51, 52, and 53 of the harnesses 5A, 5B, 5C, and 5D connected to the terminals Tc, To, and Ta, through the resistors Ra, Rb, and Re, the terminals Tc, To, Ta, and the like. In the switch modules 3A, 3B, 3C, and 3D, when the switches W1, W2, and W3 are not turned on, the current passing through the electric wires 51, 52, and 53 of the harnesses 5A, 5B, 5C, and 5D flows to the ground, through the terminals Tc1, Tc2, To1, To2, and Ta1, the resistors R4, R3, R6, and R5 connected to the electric wires 51, 52, and 53, the terminal Tg1, the electric wire 54 of the harnesses 5A, 5B, 5C, and 5D connected to the terminal Tg1, the terminal Tg of the motor modules 2A, 2B, 2C, and 2D, and the like.

In addition, when any of the switches W1, W2, and W3 is turned on the current passing through the electric wires 51, 52, and 53 of the harnesses 5A, 5B, 5C, and 5D flows to the ground, through the terminals Tc1, Tc2, To1, To2, and Ta1 connected to the electric wires 51, 52, and 53, the on-operated switches W1, W2, and W3, the terminal Tg1, the electric wire 54 of the harnesses 5A, 5B, 5C, and 5D connected to the terminal Tg1, the terminal Tg of the motor modules 2A, 2B, 2C, and 2D, and the like.

As described above, a voltage is applied to the input ports P1, P2, and P3 provided in the control unit 21 by the current flowing from the power supply Vcc1 of the motor modules 2A, 2B, 2C, and 2D to the ground, via the switch modules 3A, 3B, 3C, and 3D. Further, a magnitude of the voltage applied to the input ports P1, P2, and P3 is changed, according to an operation state of the switches W1, W2, and W3. The control unit 21 regards the change in the voltage applied to the input ports P1, P2, and P3, as an operation signal input from the switch modules 3A, 3B, 3C, and 3D via the connection unit 25 according to the operation state of the switches W1, W2, and W3. The control unit 21 controls the drive of the motor 23 by the driving unit 22, based on the operation signal, and causes the corresponding power window mechanisms 1A, 1B, 1C, and 1D to open and close the window.

As illustrated in FIG. 2, in addition to the above-described configuration, the switch module 3A in the driver's seat includes the control unit 31, a communication unit 34, switches W4*b*, W5*b*, W6*b*, W4*c*, W5*c*, W6*c*, W4*d*, W5*d*, and W6*d*, a power supply circuit 36, a voltage monitoring circuit 37, and the like. The control unit 31 includes a CPU or the like, and has a volatile memory 31*a* and a non-volatile memory 31*b* inside. The communication unit 34 includes a circuit for performing communication via the network 4.

The switches W4*b*, W5*b*, and W6*b* are turned on or off by the user, in order to remotely operate the power window mechanism 1B in the first seat. The switches W4*c*, W5*c*, and W6*c* are turned on or off by the user in order to remotely operate the power window mechanism 1C in the second seat. The switches W4*d*, W5*d*, and W6*d* are turned on or off by the user in order to remotely operate the power window mechanism 1D in the third seat. When the switches W4*b*, W4*c*, and W4*d* are turned on and off, the same operation as a case where the switch W1 of each seat is operated is performed. When the switches W5*b*, W5*c*, and W5*d* are turned on and off, the same operation as a case where the switch W2 of each seat is operated is performed. When the switches W6*b*, W6*c*, and W6*d* are turned on and off, the same operation as a case where the switch W3 of each seat is operated is performed. The switch module 3A in the driver's seat, which is installed at a position away from the switch modules 3B, 3C, and 3D in the other seats, is an example of a "first switch module" according to the embodiment of the present invention, as opposed to the motor modules 2B, 2C, and 2D in the other seats.

One end of each of the switches W4*b*, W5*b*, W6*b*, W4*c*, W5*c*, W6*c*, W4*d*, W5*d*, and W6*d* is connected to the control unit 31. The other end of each of the switches W4*b*, W5*b*, W6*b*, W4*c*, W5*c*, W6*c*, W4*d*, W5*d*, and W6*d* is grounded to the ground. The control unit 31 detects the on or off operation state of each of the switches W4*b*, W5*b*, W6*b*, W4*c*, W5*c*, W6*c*, W4*d*, W5*d*, and W6*d*. The control unit 31 generates operation command information for operating the power window mechanisms 1B, 1C, and 1D in the other seats according to the operation state, and causes the communication unit 34 to transmit the operation command information to the motor modules 2B, 2C, and 2D in the other seats via the network 4.

The power supply circuit 36 is provided on the internal wiring L11 for power supply from the vehicle-mounted battery Bt to the control unit 31. The internal wiring L11 is connected to the external power supply line 6. A rectifier diode D6 is provided between the power supply circuit 36 and the vehicle-mounted battery Bt. The power supply circuit 36 converts a high voltage supplied from the vehicle-mounted battery Bt into a predetermined low voltage, and supplies the voltage to the control unit 31. A power supply backup capacitor C2 is provided between the rectifier diode D6 and the power supply circuit 36. The voltage monitoring circuit 37 monitors a level of the supply voltage from the vehicle-mounted battery Bt.

Next, an operation of the motor modules 2A, 2B, 2C, and 2D will be described.

Figure 6:
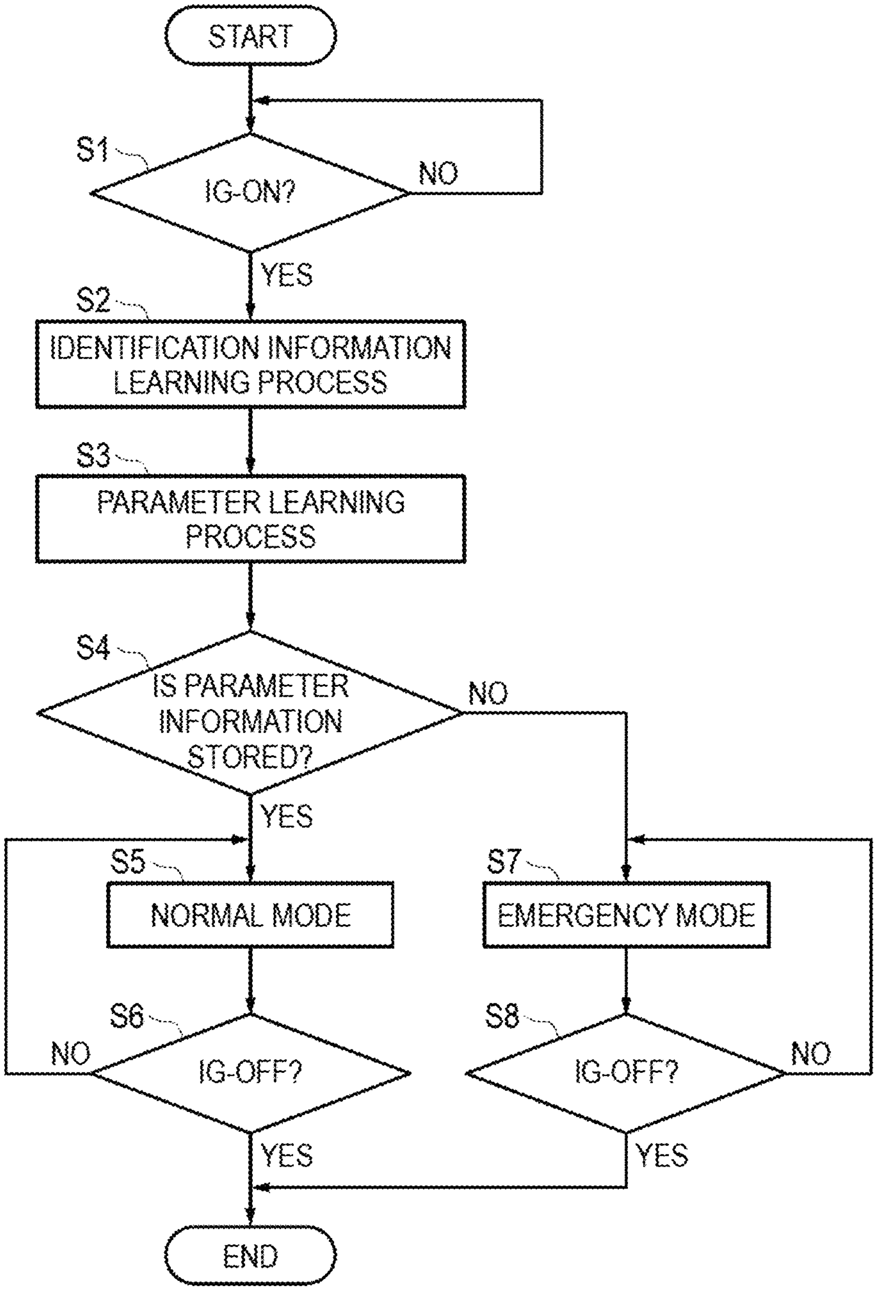
FIG. 6 is a flowchart illustrating an operation of the motor module in FIG. 1.
Figure 7:
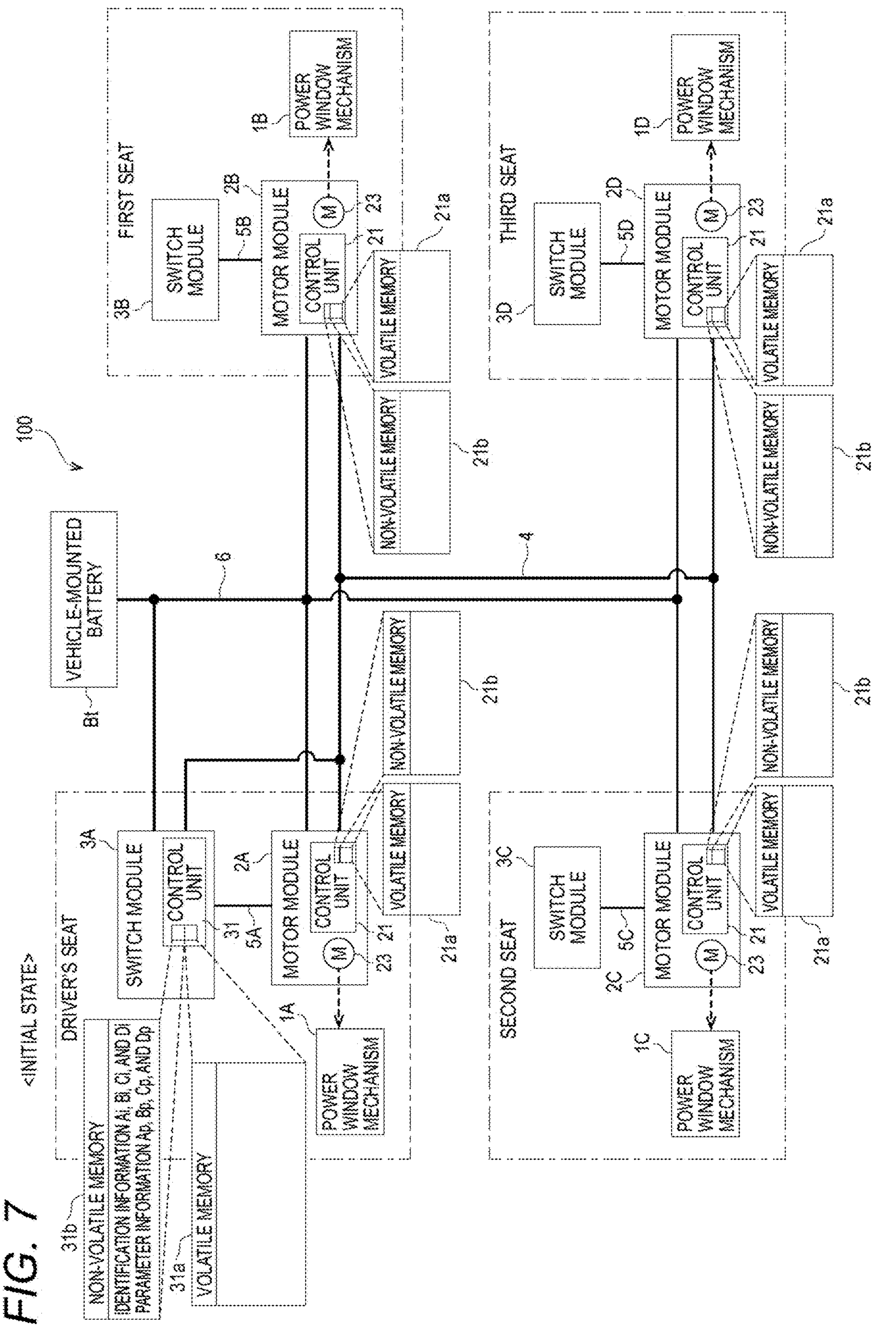
FIG. 7 is a diagram illustrating an initial state of the power window system in FIG. 1.
Figure 8:
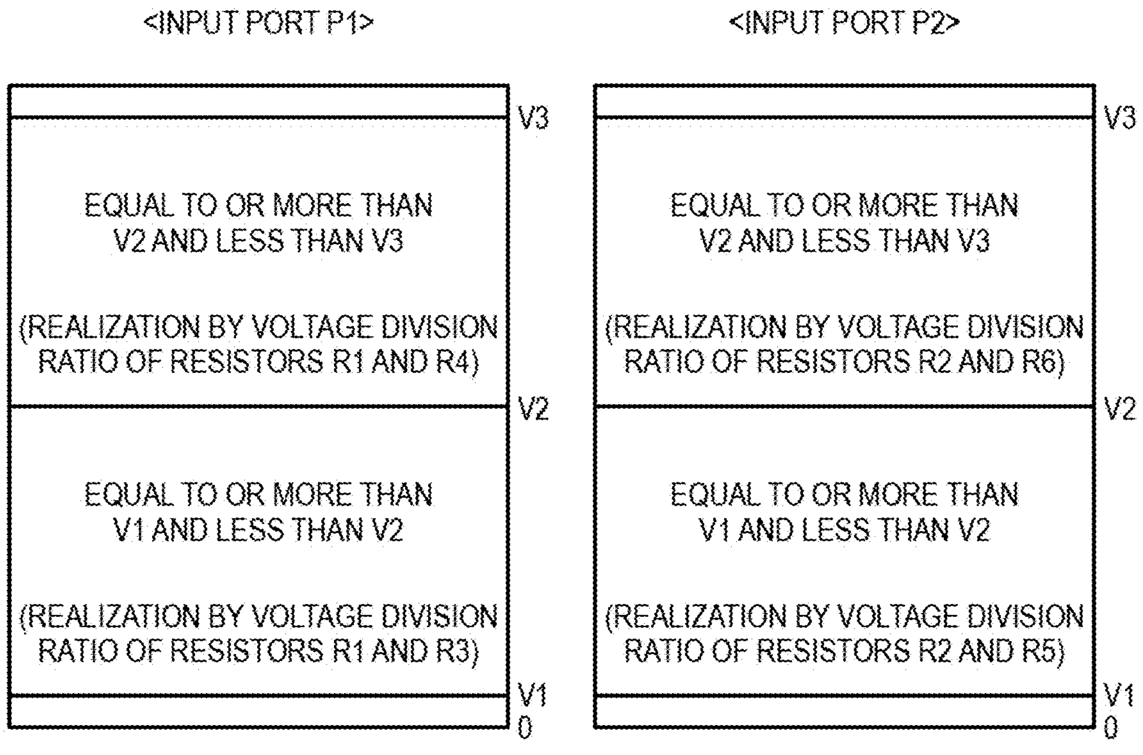
FIG. 8 is a diagram illustrating a method of determining identification information of the motor module in FIG. 1.

FIG. 6 is a flowchart illustrating an operation of the motor modules 2A, 2B, 2C, and 2D. FIG. 7 is a diagram illustrating an initial state of the power window system 100. FIGS. 8 and 9 are diagrams illustrating a method of determining identification information of the motor modules 2A, 2B, 2C, and 2D.

As illustrated in FIG. 7, in the initial state of the power window system 100, information is not stored in the volatile memory 31*a* of the switch module 3A in the driver's seat and the volatile memory 21*a* and the non-volatile memory 21*b* of each of the motor modules 2A, 2B, 2C, and 2D. On the other hand, identification information Ai, Bi, Ci, and Di and parameter information Ap, Bp, Cp, and Dp of the respective motor modules 2A, 2B, 2C, and 2D are stored in the non-volatile memory 31*b* of the switch module 3A in the driver's seat.

The identification information Ai, Bi, Ci, and Di indicate in which seat each of the motor modules 2A, 2B, 2C, and 2D is the motor module for the power window mechanism installed. The parameter information Ap, Bp, Cp, and Dp are information for controlling the motor 23 specialized for the respective power window mechanisms 1A, 1B, 1C, and 1D, for the respective motor modules 2A, 2B, 2C, and 2D to respectively operate the corresponding power window mechanisms 1A, 1B, 1C, and 1D. Specifically, for example, the parameter information Ap, Bp, Cp, and Dp includes information for controlling an opening and closing degree of the window in each of the power window mechanisms 1A, 1B, 1C, and 1D or an opening and closing speed according to an opening and closing position of the window glass, information for detecting pinching of a foreign matter and releasing the pinching in each of the power window mechanisms 1A, 1B, 1C, and 1D, and the like. The identification information Ai, Bi, Ci, and Di of the motor modules 2A, 2B, 2C, and 2D and the parameter information Ap, Bp, Cp, and Dp are stored in the non-volatile memory 31*b* in association with each other.

When an IG (ignition) switch of the vehicle is turned on (YES in step S1 in FIG. 6), the control unit 21 of the motor modules 2A, 2B, 2C, and 2D executes an identification information learning process (step S2). In this identification information learning process, the control unit 21 first checks whether or not identification information is stored in the non-volatile memory 21*b*. When the identification information is not stored in the non-volatile memory 21*b*, the control unit 21 detects a voltage value applied to the input ports P1 and P2 according to a connection state with the corresponding switch modules 3A, 3B, 3C, and 3D.

As illustrated in FIG. 2, in a case where the harness 5A is connected to the connection units 25 and 35, due to a voltage division ratio of the resistors R1 and R4, the voltage value applied to the input port P1 is included in a range equal to or more than a predetermined value V2 and less than a predetermined value V3, as illustrated in FIG. 8. Further, as illustrated in FIG. 8 due to a voltage division ratio of the resistor R2 and the resistor R6, the voltage value applied to the input port P2 is also included in the range equal to or more than the predetermined value V2 and less than the predetermined value V3. In this case, as illustrated in FIG. 9, the control unit 21 determines the identification information Ai indicating that the motor module 2A to which the motor module 2A belongs is for the power window mechanism 1A in the driver's seat, and stores the identification information Ai in the non-volatile memory 21*b*.

Further, as illustrated in FIG. 3, in a case where the harness 5B is connected to the connection units 25 and 35, due to a voltage division ratio of the resistors R1 and R4, the voltage value applied to the input port P1 is included in the range equal to or more than the predetermined value V2, and less than the predetermined value V3, as illustrated in FIG. 8. Further, due to a voltage division ratio of the resistor R2 and the resistor R5, the voltage value applied to the input port P2 is included in a range equal to or more than a predetermined value V1 and less than the predetermined value V2, as illustrated in FIG. 8. In this case, as illustrated in FIG. 9, the control unit 21 determines the identification information Bi indicating that the motor module 2B to which the motor module 2B belongs is for the power window mechanism 1B in the first seat, and stores the identification information Bi in the non-volatile memory 21*b*.

Further, as illustrated in FIG. 4, in a case where the harness 5C is connected to the connection units 25 and 35, due to a voltage division ratio of the resistors R1 and R3, the voltage value applied to the input port P1 is included in the range equal to or more than the predetermined value V1 and less than the predetermined value V2, as illustrated in FIG. 8. Further, due to a voltage division ratio of the resistor R2 and the resistor R6, the voltage value applied to the input port P2 is included in the range equal to or more than the predetermined value V2 and less than the predetermined value V3, as illustrated in FIG. 8. In this case, as illustrated in FIG. 9, the control unit 21 determines the identification information Ci indicating that the motor module 2C to which the motor module 2C belongs is for the power window mechanism 1C in the second seat, and stores the identification information Ci in the non-volatile memory 21*b*.

Further, as illustrated in FIG. 5, in a case where the harness 5D is connected to the connection units 25 and 35, due to a voltage division ratio of the resistors R1 and R3, the voltage value applied to the input port P1 is included in the range equal to or more than the predetermined value V1 and less than the predetermined value V2, as illustrated in FIG. 8. Further, as illustrated in FIG. 8, in a case where due to a voltage division ratio of the resistor R2 and the resistor R5, the voltage value applied to the input port P2 is also included in the range equal to or inure than the predetermined value V1 and less than the predetermined value V2, the control unit 21 determines the identification information Di indicating that the motor module 2D to which the motor module 2D belongs is for the power window mechanism 1D in the third seat, and stores the identification information Di in the non-volatile memory 21*b*, as illustrated in FIG. 9.

As described above, when the identification information Ai, Bi, Ci, and Di are determined by the motor modules 2A, 2B, 2C, and 2D and stored in the non-volatile memory 21*b*, the control unit 21 causes the communication unit 24 to notify the switch module 3A in the driver's seat of the identification information Ai, Bi, Ci, and Di via the network 4. As a result, the identification information learning process is ended in the motor modules 2A, 2B, 2C, and 2D.

On the other hand, a voltage value applied to at least one of the input ports P1 and P2 of the control unit 21 of the motor modules 2A, 2B, 2C, and 2D may be less than the predetermined value V1, or equal to or more than the predetermined value V3, due to some cause such as a wiring failure. In this case, the control unit 21 cannot determine identification information of the motor modules 2A, 2B, 2C, and 2D to which the control unit 21 belongs, and determines "abnormal" as illustrated in FIG. 9. The control unit 21 transmits an abnormality notification signal indicating that there is an abnormality in which the identification information cannot be learned, to the switch module 3A in the driver's seat by the communication unit 24 via the network 4. According to this, the identification information learning process is ended in the motor modules 2A, 2B, 2C, and 2D.

Immediately after the identification information learning process is started, in a case of checking that the identification information Ai, Bi, Ci, and Di is stored in the non-volatile memory 21*b*, the control unit 21 causes the communication unit 24 to transmit the identification information Ai, Bi, Ci, and Di to the switch module 3A in the driver's seat via the network 4. According to this, the identification information learning process is ended in the motor modules 2A, 2B, 2C, and 2D.

In the switch module 3A in the driver's seat, in a case where the identification information Ai, Bi, Ci, and Di transmitted from the motor modules 2A, 2B, 2C, and 2D is received by the communication unit 34, the control unit 31 stores the identification information Ai, Bi, Ci, and Di in the volatile memory 31*a*. In a case where the received identification information Ai, Bi, Ci, and Di is registered (stored) in the non-volatile memory 31*b*, the control unit 31 reads the parameter information Ap, Bp, Cp, and Dp corresponding to the identification information from the non-volatile memory 31*b*, and causes the communication unit 34 to transmit the parameter information to the motor modules 2A, 2B, 2C, and 2D via the network 4. At this time, the control unit 31 attaches the corresponding identification information Ai, Bi, Ci, and Di to the parameter information Ap, Bp, Cp, and Dp to be transmitted.

In addition, in a case where the communication unit 34 receives the abnormality notification signal transmitted from the motor modules 2A, 2B, 2C, and 2D, the control unit 31 stores contents of the abnormality notification in the volatile memory 31*a*. The control unit 31 transfers the received abnormality notification signal to an electronic control unit (ECU) (not illustrated) on the vehicle side without transmitting the parameter information Ap, Bp, Cp, and Dp via the network 4. In a case where the switch module 3A in the driver's seat does not receive the identification information or the abnormality notification signal from the motor modules 2A, 2B, 2C, and 2D for some reason such as a communication failure, nothing is stored in the volatile memory 31*a* regarding the identification information.

In the motor modules 2A, 2B, 2C, and 2D, when the identification information learning process is ended, the control unit 21 then executes a parameter learning process (step S3 in FIG. 6). In this parameter learning process, for example, the communication unit 24 receives the parameter information Ap, Bp, Cp, and Dp transmitted from the switch module 3A in the driver's seat, within a predetermined time after the identification information learning process is ended. In this case, when information which coincides with the identification information Ai, Bi, Ci, and Di stored in the non-volatile memory 21*b* is attached to the received parameter information Ap, Bp, Cp, and Dp, the control unit 21 stores the parameter information Ap, Bp, Cp, and Dp in the volatile memory 21*a*. The control unit 21 causes the communication unit 24 to transmit a learning completion notification signal indicating that learning of the parameter information Ap, Bp, Cp, and Dp is normally completed to the switch module 3A in the driver's seat via the network 4. At this time, the control unit 21 attaches the identification information Ai, Bi, Ci, and Di stored in the non-volatile memory 21*b* to the learning completion notification signal to be transmitted. As a result, the parameter learning process is ended in the motor modules 2A, 2B, 2C, and 2D.

Further, even when the parameter information Ap, Bp, Cp, and Dp is received within the predetermined time after the identification information learning process is ended, when it is not possible to check that the information which coincides with the identification information Ai, Bi, Ci, and Di is attached the parameter information Ap, Bp, Cp, and Dp stored in the non-volatile memory 21*b* within a predetermined time, the control unit 21 ends the parameter learning process. Further, even in a case where the identification information Ai, Bi, Ci, and Di are not stored in the non-volatile memory 21*b*, the control unit 21 ends the parameter learning process. In these cases, the parameter information Ap, Bp, Cp, and Dp are not stored in the volatile memory 21*a*, and the learning completion notification signal is not transmitted to the switch module 3A in the driver's seat.

Further, even in a case where the parameter information Ap, Bp, Cp, and Dp is not received within the predetermined time after the identification information learning process is ended for some reason such as a communication failure, the control unit 21 ends the parameter learning process. Also in this case, the parameter information Ap, Bp, Cp, and Dp are not stored in the volatile memory 21*a*, and the learning completion notification signal is not transmitted to the switch module 3A in the driver's seat.

In the switch module 3A in the driver's seat, in a case where the learning completion notification signal transmitted from the motor modules 2A, 2B, 2C, and 2D is received by the communication unit 34 within a predetermined time after the parameter information Ap, Bp, Cp, and Dp are transmitted, the control unit 31 stores contents of the notification signal in the volatile memory 31*a*.

On the other hand, in a case where the communication unit 34 does not receive the learning completion notification within the predetermined time after the parameter information Ap, Bp, Cp, and Dp are transmitted, the control unit 31 determines that the transmitted parameter information Ap, Bp, Cp, and Dp are not normally learned in the motor modules 2A, 2B, 2C, and 2D. The control unit 31 stores the fact in the volatile memory 31*a*, and notifies the ECU on the vehicle side of the fact.

FIG. 10 is a diagram illustrating a state after normal completion of a learning process (identification information learning process and parameter learning process) of the power window system 100. As described above, when the identification information learning process and the parameter learning process are completed without any abnormality in the motor modules 2A, 2B, 2C, and 2D, as illustrated in FIG. 10, the identification information Ai, Bi, Ci, and Di of the motor modules 2A, 2B, 2C, and 2D is stored in the non-volatile memory 21*b* of the motor modules 2A, 2B, 2C, and 2D, and the parameter information Ap, Bp, Cp, and Dp specialized for the corresponding power window mechanisms 1A, 1B, 1C, and 1D is stored in the volatile memory 21*a*. Further, an "identification information learning result" indicating that learning of identification information is normally completed, and a "parameter information learning result" indicating that learning of the parameter information process is normally completed, in the motor modules 2A, 2B, 2C, and 2D is stored in the volatile memory 31*a* of the switch module 3A in the driver's seat.

In a case where there is an abnormality in the motor modules 2A, 2B, 2C, and 2D during the identification information learning process or the parameter learning process, the "identification information learning result" or the "parameter information learning result" indicating that fact is stored in the volatile memory 31*a* of the switch module 3A in the driver's seat.

When the parameter learning process is ended in the motor modules 2A, 2B, 2C, and 2D, the control unit 21 checks whether or not the parameter information is stored in the volatile memory 21*a*. At this time, when any of the parameter information Ap, Bp, Cp, or Dp is stored in the volatile memory 21*a* (YES in step S4 in FIG. 6), the control unit 21 shifts to the normal mode (step S5). Unless the IG switch is turned off (NO in step S6), the normal mode is continued.

Figure 11:
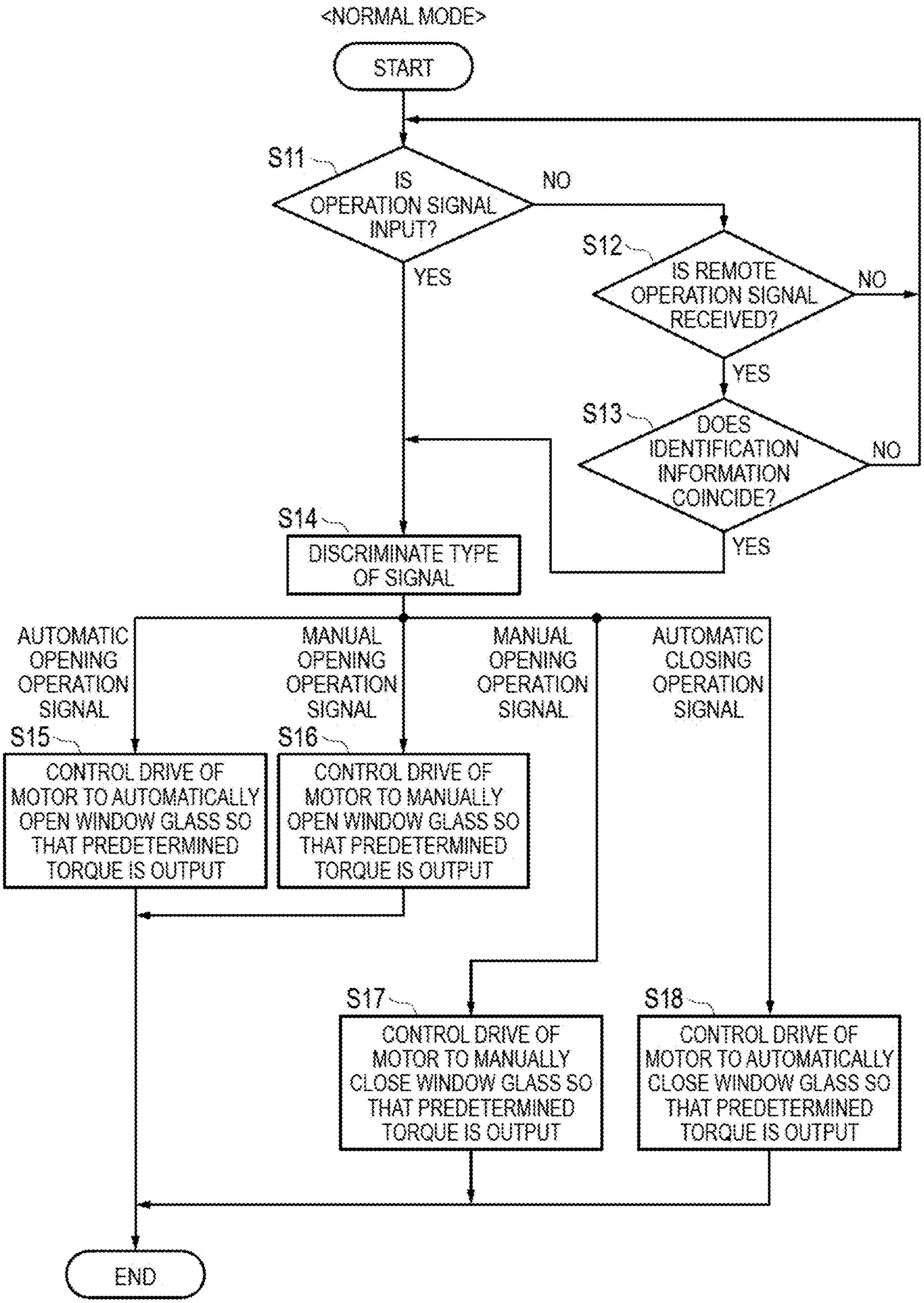
FIG. 11 is a flowchart illustrating details of a normal mode in FIG. 6.
Figure 12A:
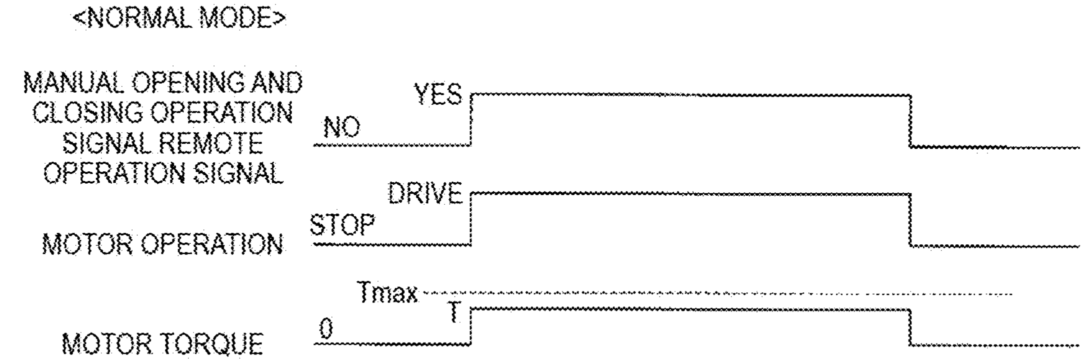
FIGS. 12A and 12B are diagrams illustrating an operation signal and a state of a motor in the normal mode in FIG. 6.
Figure 12B:
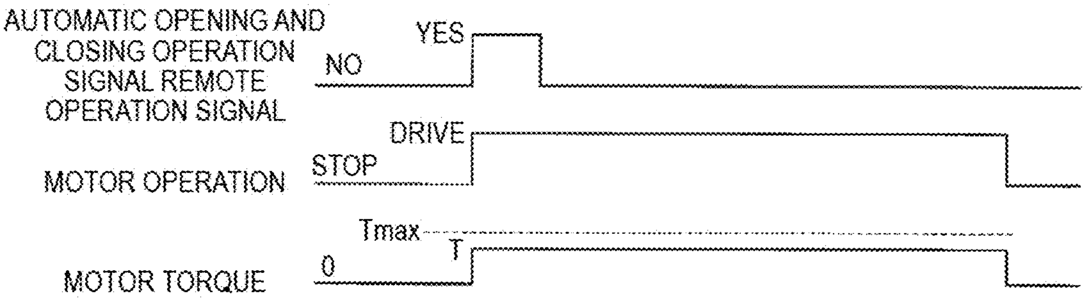

FIG. 11 is a flowchart illustrating details of the normal mode. FIGS. 12A and 12B are diagrams illustrating an operation signal and a state of the motor 23 in the normal mode.

When the motor modules 2A. 2B, 2C, and 2D are in the normal mode, and any one of the switches W1, W2, and W3 (FIGS. 2 to 5) that operate the power window mechanisms 1A, 1B, 1C, and 1D of their own seats in the switch modules 3A, 3B, 3C, and 3D is operated, an operation signal corresponding to the operation state is input from the switch modules 3A, 3B, 3C, and 3D to the corresponding motor modules 2A, 2B, 2C, and 2D via the harnesses 5A, 5B, 5C, and 5D (YES in step S11 in FIG. 11, and operation signal "yes" in FIGS. 12A and 12B).

Further, in the switch module 3A in the driver's seat, any one of the switches W4*b*, W5*b*, W6*b*, W4*c*, W5*c*, W6*c*, W4*d*, W5*d*, and W6*d* (FIG. 2) that remotely operate the power window mechanisms 1B, 1C, and 1D in the other seats is operated, the control unit 31 generates a remote operation signal of ordering an operation of the power window mechanisms 1B, 1C, and 1D in the other seats according to an operation state of the switch, and causes the communication unit 34 to transmit the remote operation signal via the network 4. At this time, the control unit 31 attaches the identification information Bi, Ci, and Di of the motor modules 2B, 2C, and 2D in the other seats corresponding to the operated switches W4*b*, W5*b*, W6*b*, W4*c*, W5*c*, W6*c*, W4*d*, W5*d*, and W6*d* to the remote operation signal.

In the motor modules 2A, 2B, 2C, and 2D, when the remote operation signal transmitted from the switch module 3A in the driver's seat is received by the communication unit 24 via the network 4 (YES in step S12 in FIG. 11), the control unit 21 collates the identification information attached to the received remote operation signal with the identification information Ai, Bi, Ci, and Di stored in the non-volatile memory 21*b*. In the motor module 2A in the driver's seat, the identification information Bi, Ci, and Di attached to the remote operation signal and the identification information Ai stored in the non-volatile memory 21*b* do not coincide with each other (NO in step S13). Meanwhile, in the motor modules 2B, 2C, and 2D in the other seats, the identification information Bi, Ci, and Di attached to the remote operation signal and the identification information Bi, Ci, and Di stored in the non-volatile memory 21*b* coincide with each other (YES in step S13). Therefore, the control unit 21 of the motor modules 2B, 2C, and 2D determines that the remote operation signal addressed to the control unit 21 is received (remote operation signal "yes" in FIGS. 12A and 12B).

Next, the control unit 21 discriminates a type of the operation signal input from the corresponding switch modules 3A, 3B, 3C, and 3D, or the remote operation signal addressed to the control unit 21 received from the switch module 3A in the driver's seat (step S14 in FIG. 11). Here, in a case where it is discriminated that the operation signal or the remote operation signal is an "automatic opening operation signal", the process proceeds to step S15. Based on the automatic opening operation signal, the parameter information Ap, B, Cp, and Dp stored in the volatile memory 21*a*, and a detection result (drive state of the motor 23, an opening and closing state of the window, or the like) of the state detection unit 21*c* (FIGS. 2 to 5), the control unit 21 causes the driving unit 22 to drive the motor 23 (motor operation "drive" in FIG. 12B), and automatically opens the window glass of the corresponding power window mechanisms 1A, 1B, 1C, and 1D so that the motor 23 outputs a predetermined torque T smaller than a maximum torque Tmax (motor torque T in FIG. 12B). The smaller the current supplied from the driving unit 22 to the motor 23, the smaller the torque output by the motor 23, the higher the rotation speed of the motor 23, and the faster the moving speed of the window glass.

In a case where it is discriminated that the operation signal or the remote operation signal is a "manual opening operation signal", the process proceeds to step S16. Based on the manual opening operation signal, the parameter information Ap, B, Cp, and Dp stored in the volatile memory 21*a*, and the detection result of the state detection unit 21*c*, the control unit 21 causes the driving unit 22 to drive the motor 23 (motor operation "drive" in FIG. 12A), and manually opens the window glass of the corresponding power window mechanisms 1A, 1B, 1C, and 1D so that the motor 23 outputs the predetermined torque T (motor torque T in FIG. 12A).

In a case where it is discriminated that the operation signal or the remote operation signal is a "manual closing operation signal", the process proceeds to step S17. Based on the manual closing operation signal, the parameter information Ap, B, Cp, and Dp stored in the volatile memory 21*a*, and the detection result of the state detection unit 21*c*, the control unit 21 causes the driving unit 22 to drive the motor 23 (motor operation "drive" in FIG. 12A), and manually closes the window glass of the corresponding power window mechanisms 1A, 1B, 1C, and 1D so that the motor 23 outputs the predetermined torque T (motor torque T in FIG. 12A).

Further, in a case where it is discriminated that the operation signal or the remote operation signal is an "automatic closing operation signal", the process proceeds to step S18. Based on the automatic closing operation signal, the parameter information Ap, B, Cp, and Dp stored in the volatile memory 21*a*, and the detection result of the state detection unit 21*e*, the control unit 21 causes the driving unit 22 to drive the motor 23 (motor operation "drive" in FIG. 12B), and automatically closes the window glass of the corresponding power window mechanisms 1A, 1B, 1C, and 1D so that the motor 23 outputs the predetermined torque T (motor torque T in FIG. 12B). Steps S15 to S18 in FIG. 11 are examples of a "normal process" according to the embodiment of the present invention.

On the other hand, in the motor modules 2A, 2B, 2C, and 2D, when the parameter information Ap, Bp. Cp, and Dp are not stored in the volatile memory 21*a* for some reason such as a failure of the volatile memory 21*a* after the parameter information learning process is ended (NO in step S4 in FIG. 6), the control unit 21 shifts to the emergency mode (step S7). After this, unless the IG switch is turned off (NO in step S8), the emergency mode is continued.

Figure 13:
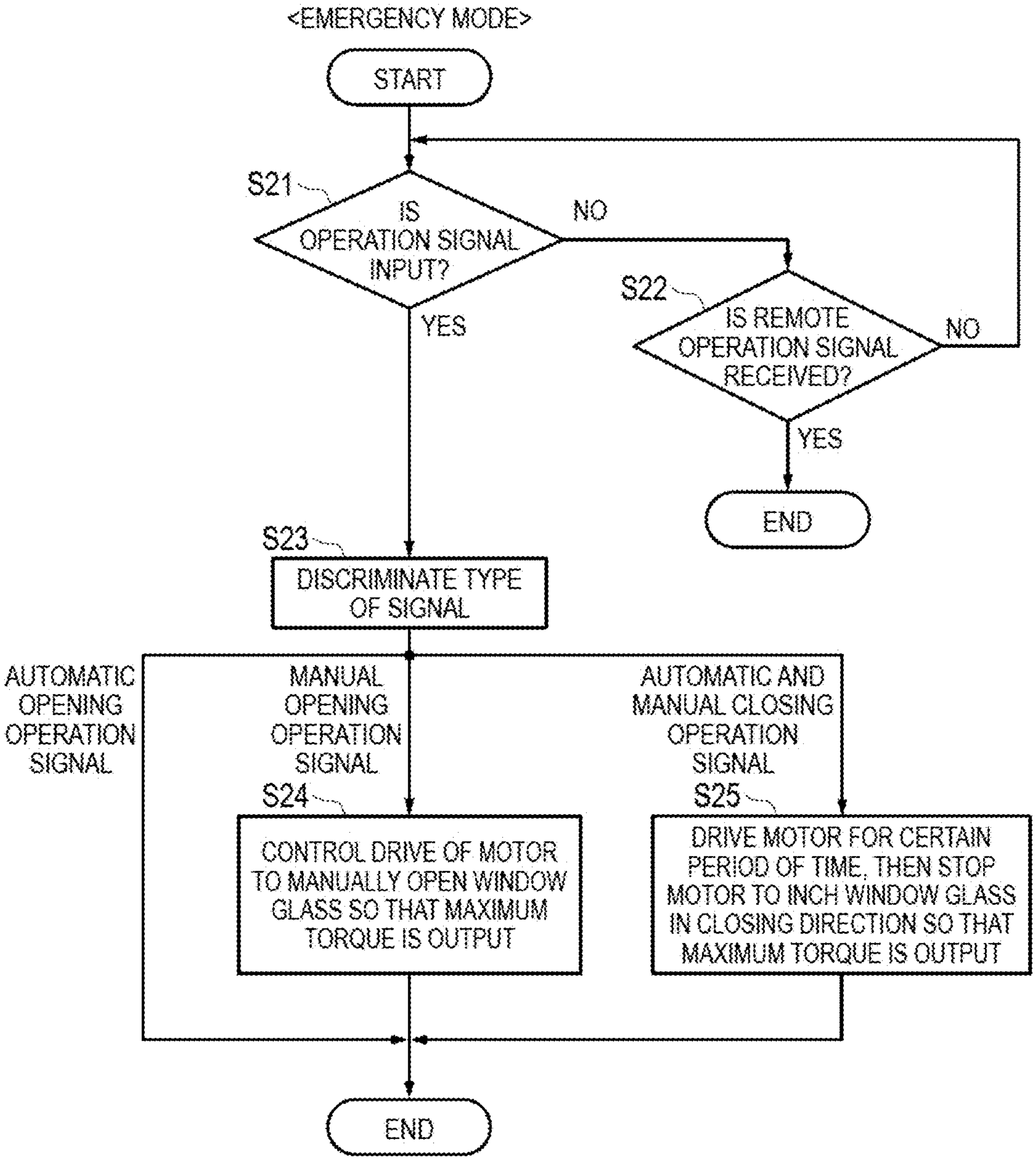
FIG. 13 is a flowchart illustrating details of an emergency mode in FIG. 6.
Figure 14A:
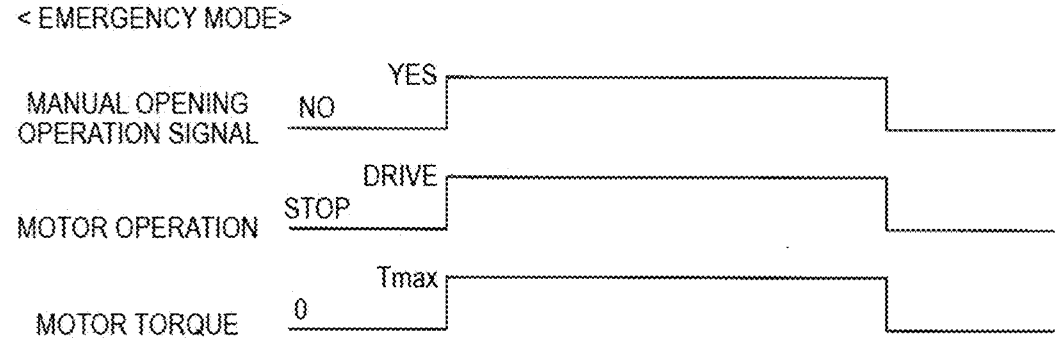
FIGS. 14A to 14D are diagrams illustrating an operation signal and a state of the motor in the emergency mode in FIG. 6.
Figure 14B:
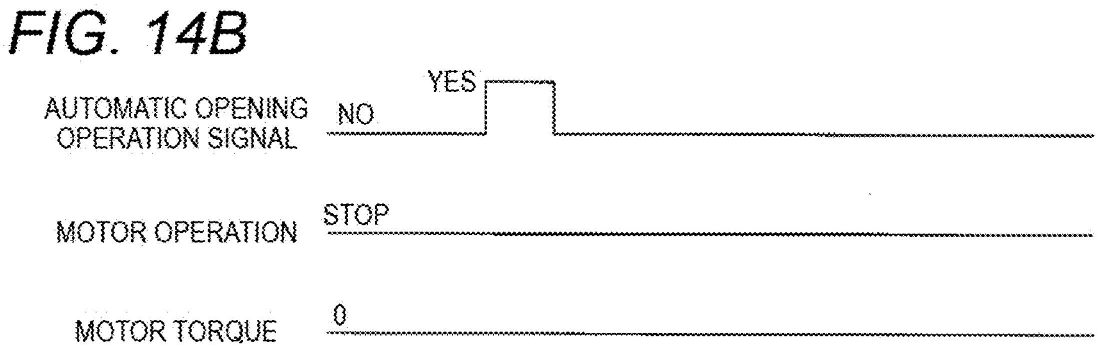
Figure 14C:
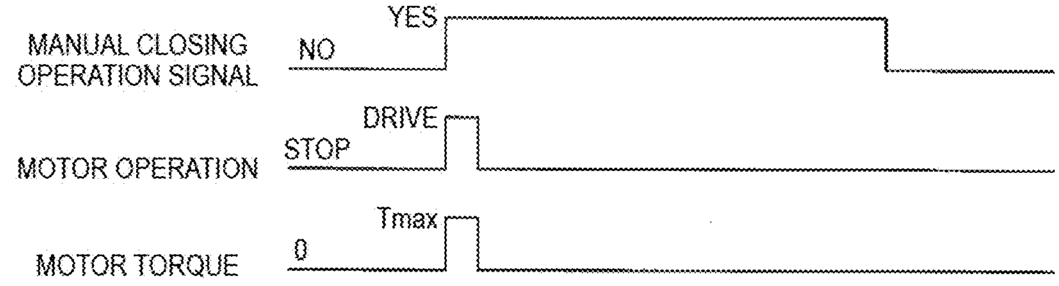
Figure 14D:
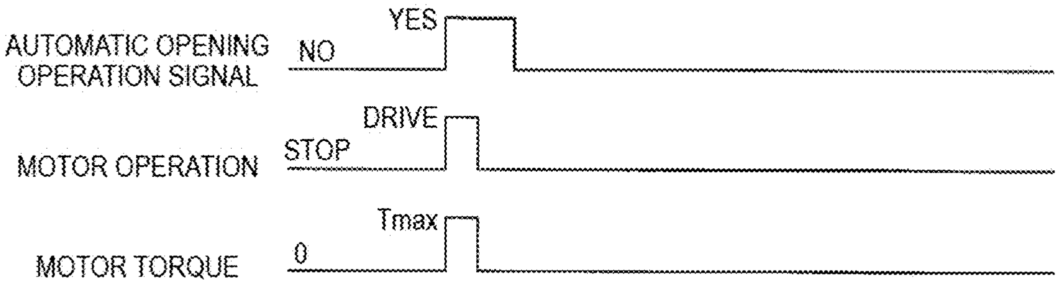

FIG. 13 is a flowchart illustrating details of the emergency mode. FIGS. 14A to 14D are diagrams illustrating an operation signal and a state of the motor 23 in the emergency mode.

In a case where an operation signal is input from the corresponding switch modules 3A, 3B, 3C, and 3D to the motor modules 2A, 2B, 2C, and 2D when the motor modules 2A, 2B, 2C, and 2D are in the emergency mode (YES in step S21 in FIG. 13, and operation signal "yes" in. FIGS. 14A, 14B, 14C, and 14D), the control unit 21 discriminates a type of the operation signal (step S23).

When it is discriminated that the operation signal is a "manual opening operation signal" (FIG. 14A), the process proceeds to step S24. Based on the manual opening operation signal, the parameter information Ap, B, Cp, and Dp stored in the volatile memory 21*a*, and the detection result of the state detection unit 21*c*, the control unit 21 causes the driving unit 22 to drive the motor 23 (motor operation "drive" in FIG. 14A), and manually opens the window glass of the corresponding power window mechanisms 1A, 1B, 1C, and 1D so that the motor 23 outputs the maximum torque Tmax (motor torque Tmax in FIG. 14A). The larger the current supplied from the driving unit 22 to the motor 23, the larger the torque output by the motor 23, the smaller the rotation speed of the motor 23, and the slower the moving speed of the window glass.

When it is discriminated that the operation signal is the "manual closing operation signal" or the "automatic closing operation signal" (FIGS. 14C and 14D), the process proceeds to step S25. Based on the manual closing operation signal or the automatic closing operation signal, the control unit 21 causes the driving unit 22 to drive the motor 23 for a short period of time (motor operation "drive" in FIGS. 14C and 14D), and inches the window glass of the corresponding power window mechanisms 1A, 1B, 1C, and 1D in a closing direction so that the motor 23 outputs the maximum torque Tmax (motor torque Tmax in FIGS. 14C and 14D). At this time, the motor 23 is driven for a short time and then stopped, and the window glass of the corresponding power window mechanisms 1A, 1B, 1C and 1D is moved in the closing direction by a small amount of displacement so that the motor 23 outputs the maximum torque Tmax even when the input of the manual or automatic closing operation signal is continued. Step S25 in FIG. 13 is an example of an "inching process" according to the embodiment of the present invention.

In a case where it is discriminated that the operation signal is the "automatic opening operation signal" (FIG. 14B), the automatic opening operation signal is ignored and the motor 23 is not driven as illustrated in FIG. 13 (motor operation "stop" in FIG. 14B), the window glass of the corresponding power window mechanisms 1A, 1B, 1C, and 1D is not opened.

On the other hand, in a case where the remote operation signal transmitted from the switch module 3A in the driver's seat is received by the communication unit 24 (YES in step S22 in FIG. 13), the control unit 21 ignores the remote operation signal and does not drive the motor 23, so the window glass of the corresponding power window mechanisms 1A, 1B, 1C, and 1D does not perform the opening and closing operation.

According to the above embodiment, in the power window system 100 of the vehicle, with the parameter learning process, the motor modules 2A, 2B, 2C, and 2D receives the parameter information Ap, Bp, Cp, and Dp for controlling the motors 23 specialized for the corresponding power window mechanisms 1A, 1B, 1C, and 1D from the switch module 3A in the driver's seat via the network 4, and stores the parameter information Ap, Bp, Cp, and Dp in the volatile memory 21*a* inside. After that, in a case where the parameter information Ap, Bp, Cp, and Dp are stored in the volatile memory 21*a*, the motor modules 2A, 2B, 2C, and 2D shift to the "normal mode". In the motor modules 2A, 2B, 2C, and 2D, based on the operation signal or the remote operation signal from the switch modules 3A, 3B, 3C, and 3D and the parameter information Ap, Bp, Cp, and Dp, the motor 23 is driven so that the motor 23 outputs the predetermined torque T, and the window glass of the corresponding power window mechanisms 1A, 1B, 1C, and 1D performs the opening and closing operation. Therefore, in normal time when the motor modules 2A, 2B, 2C, and 2D respectively have (store) the corresponding parameter information Ap, Bp, Cp, and Dp, according to the operation signal or the remote operation signal from the switch modules 3A, 3B, 3C, and 3D, it is possible for the motor modules 2A, 2B, 2C, and 2D to safely and reliably opening and closing the window glass of the power window mechanisms 1A, 1B, 1C, and 1D.

Further, in the above embodiment, in a case where the parameter information Ap, Bp, Cp, and Dp are not stored in the volatile memory 21*a* for some reason such as a failure, the motor modules 2A, 2B, 2C, and 2D shift to the "emergency mode". Based on the closing operation signal from the switch modules 3A, 3B, 3C, and 3D in the same seat, the motor modules 2A, 2B, 2C, and 2D drive the motor 23 for a certain period of time, and inch the window glass of the corresponding power window mechanisms 1A, 1B, 1C, and 1D in the closing direction so that the motor 23 outputs the maximum torque Tmax. Therefore, even in an emergency when the motor modules 2A, 2B, 2C, and 2D do not have (store) the parameter information Ap, Bp, Cp, and Dp, according to the closing operation signal from the switch modules 3A, 3B, 3C, and 3D in the same seat, it is possible for the motor modules 2A, 2B, 2C, and 2D to safely and reliably inch the window glass of the power window mechanisms 1A, 1B, 1C, and 1D in the closing direction, so that convenience for the user is also ensured. Further, in the emergency mode, even when the switches W1, W2, and W3 of the switch modules 3A, 3B, 3C, and 3D are closed, the window glass of the power window mechanisms 1A, 1B, 1C, and 1D are slightly displaced in the closing direction then stopped, so that it is possible to avoid the danger of foreign matter being caught in the window or the like and to ensure high safety. Further, by repeating the closing operation of the switches W1, W2, and W3 many times, the window glass can be moved little by little in the closing direction to close the window.

Further, in the above embodiment, based on the manual opening operation signal from the switch modules 3A, 3B, 3C, and 3D in the same seat, the motor modules 2A, 2B, 2C, and 2D control the drive of the motor 23 to manually open the window glass of the corresponding power window mechanisms 1A, 1B, 1C, and 1D so that the motor 23 outputs the maximum torque Tmax. Therefore, even in an emergency when the motor modules 2A, 2B, 2C, and 2D do not have (store) the parameter information Ap, Bp, Cp, and Dp, according to the manual opening operation signal from the switch modules 3A, 3B, 3C, and 3D in the same seat, it is possible for the motor modules 2A, 2B, 2C, and 2D to safely and reliably open the window glass of the power window mechanisms 1A, 1B, 1C, and 1D manually, so that convenience for the user is improved.

Further, in the above embodiment, in the emergency mode, the automatic opening operation signal input from the switch modules 3A, 3B, 3C, and 3D is ignored, so that the window glasses of the power window mechanisms 1A, 1B, 1C, and 1D of the respective seats are not opened widely, and safety can be ensured. Further, in the motor modules 2B, 2C and 2D in the other seats, the remote operation signal received from the switch module 3A in the driver's seat is ignored, so that the window glasses of the power window mechanisms 1B, 1C, and 1D of the other seats are not opened and closed by remote operation, and higher safety can be ensured.

Further, in the above embodiment, in the identification information learning process, based on the voltage applied to the input ports P1 and P2 according to the connection state with the switch modules 3A, 3B, 3C, and 3D without going through the network 4 (the connection state between the connection unit 25 of the motor module and the connection unit 35 of the switch module), the motor modules 2A, 2B, 2C, and 2D determine the identification information Ai, Bi, Ci, and Di of the motor modules 2A, 2B, 2C, and 2D, and store the identification information Ai, Bi, Ci, and Di in the non-volatile memory 21*b*. When transmitting the parameter information Ap, Bp, Cp, and Dp or the remote operation signal via the network 4, the switch module 3A in the driver's seat attaches the identification information Ai, Bi, Ci, and Di of the motor modules 2A, 2B, 2C, and 2D of the transmission destination to the information. Therefore, the motor modules 2A, 2B, 2C, and 2D reliably receive the parameter information Ap, Bp, Cp, and Dp or the remote operation signal of the motor modules 2A, 2B, 2C, and 2D to which the identification information Ai, Bi, Ci, and Di of the motor modules 2A, 2B, 2C, and 2D are attached, the window glass of the corresponding power window mechanisms 1A, 1B, 1C, and 1D can be opened and closed safely and appropriately, based on this information.

Further, in the above embodiment, the identification information Ai, Bi, Ci, and Di of the respective motor modules 2A, 2B, 2C, and 2D indicate which power window mechanism the motor module is for. The parameter information Ap, Bp, Cp, and Dp corresponding to the respective identification information Ai, Bi, Ci, and Di are parameter information for controlling the motor 23, specialized for the power window mechanism corresponding to the identification information. Therefore, in the motor modules 2A, 2B, 2C, and 2D, the parameter information Ap, Bp, Cp, and Dp appropriate for respectively operating the corresponding power window mechanisms 1A, 1B, 1C, and 1D can be reliably received from the switch module 3A in the driver's seat, and the corresponding power window mechanisms 1A, 1B, 1C, and 1D can be appropriately opened and closed, based on the parameter information.

Further, even when the plurality of power window mechanisms 1A, 1B, 1C, and 1D have physical individual differences in shapes, friction coefficients between members, or the like, it is possible to use the plurality of motor modules 2A, 2B, 2C, and 2D having identical specifications and performance, for causing the power window mechanisms to perform the opening and closing operation. Further, regardless of a type of the vehicle or an installation location of the motor module, the motor modules 2A, 2B, 2C, and 2D having the identical specifications and performance can be used for the power window mechanism of the respective seats. Further, it is not necessary to make component numbers different among the plurality of motor modules, and it is possible to reduce the component numbers, and facilitate handling and management of the motor modules.

In the embodiment of the present invention, various embodiments other than the embodiment described above can be adopted.

For example, in the above-described embodiment, for the motor modules 2A, 2B, 2C, and 2D, the identification information Ai, Bi, Ci, and Di are stored in the non-volatile memory 21*b*, and the parameter information Ap, Bp, Cp, and Dp are stored in the volatile memory 21*a*, and the embodiment of the present invention is not limited to this. The identification information may be stored in the volatile memory 21*a*, or the parameter information may be stored in the non-volatile memory 21*b*. Further, both the identification information and the parameter information may be stored in the volatile memory 21*a*, or may be stored in the non-volatile memory 21*b*.

Further, in the above-described embodiment, based on the voltage applied to the input ports P1 and P2 according to the connection state with the switch modules 3A, 3B, 3C, and 3D, the motor modules 2A, 2B, 2C, and 2D determine the identification information Ai, Bi, Ci, and Di of the motor modules 2A, 2B, 2C, and 2D, and stores the identification information Ai, Bi, Ci, and Di in the non-volatile memory 21*b*, and in another method, the motor module may determine identification information of the motor module, and store the identification information in the memory. Further, the non-volatile memory 21*b* of the motor modules 2A, 2B, 2C, and 2D stores the identification information of the motor modules 2A, 2B, 2C, and 2D in advance, and the control unit 21 may read the non-volatile memory 21*b* to recognize the identification information. In this case, a processing load on the motor modules 2A, 2B, 2C, and 2D is reduced, and it is possible to shorten a time until the power window mechanisms 1A, 1B, 1C, and 1D can be operated.

Further, in the above-described embodiment, when a manual opening operation signal is input from the switch modules 3A, 3B, 3C, and 3D when the motor modules 2A, 2B, 2C, and 2D are in the emergency mode, the window glass of the power window mechanisms 1A, 1B, 1C, and 1D are manually opened, and when an automatic or manual closing operation signal is input, the window glass is inched in the closing direction, and the embodiment of the invention is not limited to this. In addition to this, for example, when an automatic opening operation signal is input from the switch module when the motor module is in the emergency mode, the power window mechanism may be automatically opened, or when an automatic or manual opening operation signal is input, the power window mechanism may be inched in an opening direction. Further, in a case where a remote operation signal is received from the motor module 2A in the driver's seat the motor modules 2B, 2C, and 2D in the other seats are in the emergency mode, the operation of the window glass of the power window mechanisms 1B, 1C, and 1D may be controlled, in the same manner as the case where the operation signal is input from the switch modules 3B, 3C, and 3D in the same seat.

Further, in the embodiment illustrated in FIGS. 12A and 12B, and 14A to 14D, an example in which the motor 23 is driven so that the motor 23 of the motor modules 2A, 2B, 2C, and 2D outputs a constant torque is described, and the drive of the motor 23 may be controlled so that a magnitude of the output torque is changed according to an opening and closing position of the window glass, a load applied to the motor 23, or the like, for example.

Further, in the above-described embodiment, the example in which the motor modules 2A, 2B, 2C, and 2D determine and store identification information of the motor modules 2A, 2B, 2C, and 2D once in the identification information learning process, and receive and store parameter information of the motor modules 2A, 2B, 2C, and 2D once also in the parameter learning process is described, and when the storage of the identification information or the parameter information fails, the learning process may be retried up to a predetermined number of times.

Further, in the above-described embodiment, the example in which the power window system 100 is provided with the respective four power window mechanisms 1A, 1B, 1C, and 1D, motor modules 2A, 2B, 2C, and 2D, and switch modules 3A, 3B, 3C, and 3D is described, and each of these numbers may be one, or may be plural other than four.

Further, in the above-described embodiment, the switch module 3A in the driver's seat is used as the management module, or switch modules having the same configuration as the switch modules 3B, 3C, and 3D in the other seats may be used as the switch module in the driver's seat, and a management module different from the switch modules may be provided.

Further, in the above embodiment, the power window mechanisms 1A, 1B, 1C, and 1D are given as examples of the vehicle-mounted device, or the embodiment of the present invention can also be applied to a motor module for operating other vehicle-mounted devices.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A motor module comprising:

a motor that is a power source of a vehicle-mounted device mounted on a vehicle;

a driving unit that drives the motor;

a control unit that operates the driving unit and controls the drive of the motor to operate the vehicle-mounted device;

a memory that stores information for the control unit to operate the vehicle-mounted device; and a communication unit that performs communication via a network built in the vehicle, wherein the control unit executes a parameter learning process of receiving parameter information for motor control specialized for the vehicle-mounted device for operating the vehicle-mounted device by the communication unit from a management module that manages the motor module, and storing the parameter information in the memory, a normal process of, in a case where the parameter information is stored in the memory, driving the motor by the driving unit to operate the vehicle-mounted device so that the motor outputs a predetermined torque, based on an operation signal input from an outside for operating the vehicle-mounted device and the parameter information, and an inching process of, in a case where the parameter information is not stored in the memory, driving the motor by the driving unit for a certain period of time and then stopping the motor to inch the vehicle-mounted device so that the motor outputs a maximum torque, based on the operation signal.

2. The motor module according to claim 1, wherein identification information indicating which vehicle-mounted device the motor module is for is stored in the memory in advance, and the control unit is configured to in the parameter learning process, when identification information which coincides with the identification information stored in the memory is attached to the parameter information received from the management module, store the parameter information in the memory, in a case where the parameter information is stored in the memory, when the operation signal is an operation signal input from an operation module installed at a position near the motor module without going through the network, or is a remote operation signal which is received from the management module installed at a position away from the motor module via the network and to which identification information which coincides with the identification information stored in the memory is attached, execute the normal process, and in a case where the parameter information is not stored in the memory, when the operation signal is input from the operation module, execute the inching process.

3. The motor module according to claim 2, further comprising:

a connection unit to which the operation module is connected without going through the network, wherein the control unit further executes an identification information learning process of determining the identification information of the motor module based on a voltage applied according to a connection state between the connection unit of the motor module and a connection unit provided in the operation module, and storing the identification information in the memory.

4. The motor module according to claim 2, wherein the vehicle-mounted device includes a power window mechanism provided in a predetermined seat of the vehicle, the management module includes a first switch module provided at a position away from the predetermined seat and remotely operating the power window mechanism, the operation module includes a second switch module provided in the predetermined seat and operating the power window mechanism, and the control unit is configured to in the normal process, based on an automatic or manual remote opening and closing operation signal transmitted from the first switch module according to an operation state of the first switch module and received by the communication unit, or an automatic or manual opening and closing operation signal input from the second switch module according to an operation state of the second switch module, and the parameter information stored in the memory, drive the motor by the driving unit to automatically or manually open or close a window glass of the power window mechanism so that the motor outputs a predetermined torque, and in a ease where the parameter information is not stored in the memory, when a manual opening operation signal is input from the second switch module, based on the opening operation signal, drive the motor by the driving unit to manually open the window glass of the power window mechanism so that the motor outputs the maximum torque, and when an automatic or manual closing operation signal is input from the second switch module, based on the closing operation signal, drive the motor by the driving unit for a certain period of time and then stops the motor to inch the window glass of the power window mechanism in a closing direction so that the motor outputs the maximum torque.

* * * * *